United States Patent
Asakawa et al.

[19]

[11] Patent Number: 6,072,459
[45] Date of Patent: Jun. 6, 2000

[54] PROJECTION-TYPE LIQUID CRYSTAL DISPLAY APPARATUS

[75] Inventors: Katsumi Asakawa; Hiroaki Ishitani; Kouhei Tamano; Shigeharu Yoshikawa; Akihisa Miyata, all of Tokyo, Japan

[73] Assignee: Mitsubishi Denki Kabushiki Kaisha, Tokyo, Japan

[21] Appl. No.: 08/959,232

[22] Filed: Oct. 28, 1997

[30] Foreign Application Priority Data

Oct. 29, 1996 [JP] Japan ..................................... 8-286749

[51] Int. Cl.$^7$ ....................................................... G09G 3/18
[52] U.S. Cl. ............................ 345/101; 349/72; 349/161
[58] Field of Search ........................... 349/72, 161, 199; 219/209, 210; 345/101, 87, 1–3; 348/748, 751

[56] References Cited

U.S. PATENT DOCUMENTS

| | | | |
|---|---|---|---|
| 4,029,393 | 6/1977 | Dungan et al. | 349/161 |
| 4,670,654 | 6/1987 | Ross | 349/128 |
| 4,763,992 | 8/1988 | Takada et al. | 349/72 |
| 4,773,735 | 9/1988 | Ukrainsky et al. | 349/161 |
| 4,829,154 | 5/1989 | Teshima et al. | 319/209 |
| 4,987,289 | 1/1991 | Bishop et al. | 349/199 |
| 5,041,821 | 8/1991 | Oritsuka et al. | 345/94 |
| 5,119,215 | 6/1992 | Marks et al. | 349/161 |
| 5,247,374 | 9/1993 | Terada | 347/166 |
| 5,300,942 | 4/1994 | Dolgoff | 345/90 |
| 5,412,492 | 5/1995 | Zammit et al. | 349/58 |
| 5,559,614 | 9/1996 | Urbish et al. | 349/72 |

FOREIGN PATENT DOCUMENTS

| | | |
|---|---|---|
| 0239247A1 | 9/1987 | European Pat. Off. . |
| 588 019 A2 | 3/1994 | European Pat. Off. . |
| 79136 | 3/1995 | Japan . |
| 2 259 786 | 3/1993 | United Kingdom . |
| 2 306 745 | 5/1997 | United Kingdom . |
| 97/05519 | 2/1997 | WIPO . |

Primary Examiner—Lun-Yi Lao

[57] ABSTRACT

A projection-type liquid crystal display apparatus that prevents deterioration of a projected image occurring attributable to lowering of the temperature of a liquid crystal panel, the difference in the temperature between the liquid crystal panels and temperature inclination in the liquid crystal panel. A projection-type liquid crystal display apparatus having a light source 1, liquid crystal panels 12, 13 and 14 for modulating a light beam emitted by the light source 1, a projection lens 21 for projecting the modulated light beam onto a screen 28, temperature detectors 25, 26 and 27 for detecting the temperatures of portions adjacent to the liquid crystal panels 12, 13 and 14, heater elements 18, 19 and 20 disposed adjacent to image forming surfaces of the liquid crystal panels 12, 13 and 14 and on a light path of a light beam emitted from the light source 1, a drive circuit 40 for operating the heater elements 18, 19 and 20 and a control unit 35 for controlling the heat generating performance of the heater elements 18, 19 and 20 in accordance with values detected by the temperature detectors 25, 26 and 27.

19 Claims, 14 Drawing Sheets

1: LIGHT SOURCE
2: WHITE LAMP
3: ELLIPTIC MIRROR
4, 10, 11: MIRROR
5: COLLIMATOR LENS
6 TO 9: DICHROIC MIRROR
12 TO 14: LIQUID CRYSTAL PANEL
15 TO 17: FIELD LENS
18 TO 20: HEATER ELEMENT
21: PROJECTION LENS
22: LIGHT-SOURCE COOLING FAN
23: LIQUID-CRYSTAL-PANEL COOLING FAN
24 TO 27: TEMPERATURE DETECTOR
28: SCREEN
30 TO 34: A/D CONVERTER

1: LIGHT SOURCE
2: WHITE LAMP
3: ELLIPTIC MIRROR
4, 10, 11: MIRROR
5: COLLIMATOR LENS
6 TO 9: DICHROIC MIRROR
12 TO 14: LIQUID CRYSTAL PANEL
15 TO 17: FIELD LENS

18 TO 20: HEATER ELEMENT
21: PROJECTION LENS
22: LIGHT-SOURCE COOLING FAN
23: LIQUID-CRYSTAL-PANEL COOLING FAN
24 TO 27: TEMPERATURE DETECTOR
28: SCREEN
30 TO 34: A/D CONVERTER

CONTROL SIGNAL "a"

bcde
CONTROL SIGNAL

| | CONTROL SIGNAL<br>bcde  bcde |
|---|---|
| PATTERN 1 | 0000, 0010 |
| PATTERN 2 | 1000, 1010 |
| PATTERN 3 | 0100, 0110 |
| PATTERN 4 | 1100, 1110 |
| PATTERN 5 | 1011, 1111 |
| PATTERN 6 | 0011, 0111 |
| PATTERN 7 | 1001, 1101 |
| PATTERN 8 | 0001, 0101 |

…

PROJECTION-TYPE LIQUID CRYSTAL DISPLAY APPARATUS

DETAILED DESCRIPTION OF THE INVENTION

1. FIELD OF THE INVENTION

The present invention relates to a projection-type liquid crystal apparatus for displaying an image by projecting an image displayed on a liquid crystal panel onto a screen, and more particularly to control of the temperature of a liquid crystal panel and that of temperature inclination occurring in the liquid crystal panel.

2. DESCRIPTION OF THE RELATED ART

A conventional projection-type liquid crystal apparatus employing control of the temperature of the liquid crystal panel thereof has been disclosed in, for example, Japanese Utility-Model Publication No. Hei 7-9136. The foregoing apparatus has a liquid crystal panel in the frame thereof and arranged such that a cooling fan is operated in accordance with a value detected by a temperature detector in the frame to stabilize the temperature of the liquid crystal panel.

If the above-mentioned conventional projection-type liquid crystal display apparatus is operated in a low-temperature environment, the liquid crystal panel cannot be heated to an optimum operation level. Thus, there arises problems in that the response speed is lowered, that the resolution of dynamic images deteriorates and a residual image is superimposed and displayed when the frame has been switched.

Also in a case where a liquid crystal panel made of an LCPC (Liquid Crystal Polymer Composite) material which is one of polymer dispersion type liquid crystal is employed, a fact was found that a problem of the hysteresis causing a residual image is superimposed and displayed when a still image has been switched to another frame occurring depending upon the temperature of the liquid crystal panel cannot be overcome.

A projection-type liquid crystal apparatus, of a type having three liquid crystal panels for respectively modulating a red beam, a green beam and a blue beam and then synthesizing the beams to project a color image, has a problem in that the tone of the color image is changed owning to the difference in the temperatures of the respective liquid crystal panels and the difference in the wavelength of the colors.

Another problem arises in that an image forming surface of even one liquid crystal panel encounters temperature inclination along the surface attributable to air flows generated by a cooling fan or the like and the thus the projected image has illuminance inclination.

SUMMARY OF THE INVENTION

The present invention overcomes the foregoing problems experienced with the conventional technique and thus an object of the present invention is to provide a projection-type liquid crystal apparatus which is capable of preventing deterioration or the like of a projected image owning to lowering of the temperature of the liquid crystal panel, the difference in the temperatures between liquid crystal panels and temperature inclination in the liquid crystal panel and which enables an excellent image to stably be projected.

According to a first aspect of the present invention, there is provided a projection-type liquid crystal display apparatus having a light source means; a liquid crystal light valve means for modulating a light beam emitted by the light source means; a projecting means for projecting a light beam modulated by the liquid crystal light valve means onto a screen; a liquid-crystal temperature detection means for detecting the temperature of a portion adjacent to the liquid crystal light valve means; a transparent conductive film formed adjacent to a surface of the liquid crystal light valve means on which an image will be formed, the transparent conductive film being formed on a light path for the light beam emitted from the light source means; drive means for causing the transparent conductive film to generate heat; and control means for controlling heat generating performance of the transparent conductive film in accordance with a value detected by the liquid-crystal temperature detection means.

According to a second aspect of the present invention, there is provided a projection-type liquid crystal display apparatus according to the first aspect, wherein the liquid crystal light valve means has first to third liquid crystal panels for respectively forming monochrome images in first to third colors, the liquid-crystal temperature detection means has first to third temperature detectors for respectively detecting the temperature of portions adjacent to the first to third liquid crystal panels, the transparent conductive film has first to third conductive films respectively formed adjacent to the first to third liquid crystal panels, and control of the drive means performed by the control means such that the heat generating performance of each of the first to third conductive films is set in accordance with each of values detected by the first to third temperature detectors.

According to a third aspect of the present invention, there is provided a projection-type liquid crystal display apparatus according to the first or the second aspect, further comprising an air fan for allowing air around the liquid crystal light valve means to flow, wherein when the temperature detected by the liquid-crystal temperature detection means is lower than a first predetermined reference temperature, the transparent conductive film is caused to generate heat with the operation of the air fan interrupted, when the temperature detected by the liquid-crystal temperature detection means is not lower than the first reference temperature and lower than a second predetermined reference temperature, the transparent conductive film is caused to generate heat with the air fan being operated, and when the temperature detected by the liquid-crystal temperature detection means is not lower than a second predetermined temperature, the heat generating performance of the transparent conductive film is lowered.

According to a fourth aspect of the present invention, there is provided a projection-type liquid crystal apparatus according to the first aspect, wherein the liquid-crystal display temperature detection means has a plurality of temperature detectors, and the control means controls the heat generating performance of the transparent conductive film in accordance with the total sum of a value obtained by multiplying each of values detected by the plural temperature detectors with a weighting coefficient.

According to a fifth aspect of the present invention, there is provided a projection-type liquid crystal display apparatus according to any of the first to fourth aspects, wherein after the temperature detected by the liquid-crystal temperature detection means has been raised to an optimum operation temperature and thus the heat generating performance of the transparent conductive film has been lowered or turned off, a first process is repeated if $|D(t)-D(t-\Delta t)|>D_{th}$ is satisfied on an assumption that a value-detected by the liquid-crystal temperature detection means at time $t-\Delta t$ (where $\Delta t$ is a predetermined unit period of time) is $D(t-\Delta t)$, a value detected by the liquid-crystal temperature detection means at time $t$ is $D(t)$ and a predetermined reference value is $D_{th}$ such that the heat generating performance of the transparent conductive film is raised, and the heat generating performance of the transparent conductive film is not changed and thus the same is fixed if $|D(t)-D(t-\Delta t)|\_D_{th}$, detected value $D(t')$ when the heat generating performance of the transparent conductive film has been changed finally is stored, and a second process is performed in a case where the relationship $|D(t)-D(t-\Delta t)|\_D_{th}$ is satisfied after the first process has been repeated and thus the process for fixing the heat generating performance of the transparent conductive film without changing the same has been repeated by a predetermined number of times such that the heat generating performance of the transparent conductive film is controlled in accordance with the detected value $D(t)$ if the absolute value $|D(t)-D(t')|$ of an amount of change between the detected value $D(t)$ after a predetermined period of time has elapsed and the stored value $D(t')$ is larger than a predetermined reference value $D_{th}'$ and the heat generating performance of the transparent conductive film is not changed and the same is fixed if the absolute value $|D(t)-D(t')|$ is not larger than the reference value $D_{th}'$.

According to a sixth aspect of the present invention, there is provided a projection-type liquid crystal display apparatus according to any one of the first to fifth aspects, wherein the heat generating performance of the transparent conductive film can be switched at least between first heat generating performance and second heat generating performance higher than the first heat generating performance, the transparent conductive film is operated with the second heat generating performance when the apparatus is turned on, and time at which the operation of the transparent conductive film with the second heat generating performance is switched to the operation with the first heat generating performance is determined in accordance with a value detected by an external temperature detection means for detecting the temperature of the outside of the apparatus.

According to a seventh aspect of the present invention, there is provided a projection-type liquid crystal display apparatus according to any one of first to sixth aspects, further comprising external temperature detection means for detecting the temperature of the outside of the apparatus, wherein when a determination has been made that the value detected by the liquid-crystal temperature detection means has been raised to an optimum operation temperature during control of the heat generating performance of the transparent conductive film in accordance with the value detected by the external temperature detection means, the heat generating performance of the transparent conductive film is lowered in accordance with the value detected by the external temperature detection means.

According to an eighth aspect of the present invention, there is provided a projection-type liquid crystal display apparatus according to any one of the first to sixth aspects, further comprising external temperature detection means for detecting the temperature of the outside of the apparatus, wherein the heat generating performance of the transparent conductive film can be switched at least between first heat generating performance and second heat generating performance higher than the first heat generating performance, storage means is provided which previously stores a control value of optimum time at which the heat generating performance of the transparent conductive film is made to be the second heat generating performance with respect to a value detected by the external temperature detection means and a value detected by the liquid-crystal temperature detection means, and the heat generating performance of the transparent conductive film is switched in accordance with the control value stored in the storage means corresponding to the value detected by the external temperature detection means and the value detected by the liquid-crystal temperature detection means.

According to a ninth aspect of the present invention, there is provided a projection-type liquid crystal display apparatus according to any one of the first to sixth aspects, further comprising external temperature detection means for detecting the temperature of the outside of the apparatus, wherein the heat generating performance of the transparent conductive film can be switched at least between first heat generating performance and second heat generating performance higher than the first heat generating performance, and when a determination has been made that the value detected by the liquid-crystal temperature detection means has been raised to an optimum operation temperature during control of the heat generating performance of the transparent conductive film in accordance with the value detected by the external temperature detection means, the heat generating performance of the transparent conductive film is switched in accordance with the value detected by the external temperature detection means.

According to a tenth aspect of the present invention, there is provided a projection-type liquid crystal display apparatus according to any one of the first to ninth aspects, further comprising inverting means for, at predetermined periods, inverting a direction of DC voltage which is applied to the transparent conductive film by the drive means of the transparent conductive film.

According to an eleventh aspect of the present invention, there is provided a projection-type liquid crystal display apparatus according to any one of first to tenth aspects, wherein the liquid crystal light valve means has a source electrode, to which an image signal is supplied, and a liquid crystal layer, the transparent conductive film forms a common electrode-of the liquid crystal light valve means, and the apparatus has a DC current interrupting film disposed between the liquid crystal layer and the transparent conductive film, and common voltage applying means for applying AC(alternative current) common voltage to the transparent conductive film.

According to a twelfth aspect of the present invention, there is provided a projection-type liquid crystal display apparatus according to any one of the first to tenth aspects, wherein the liquid-crystal temperature detection means is disposed on the outside of an image forming surface of the liquid crystal light valve means.

According to a thirteenth aspect of the present invention, there is provided a projection-type liquid-crystal display apparatus according to any one of the first to twelfth aspects, wherein the transparent conductive film is formed on an image forming surface of the liquid crystal light valve means.

According to a fourteenth aspect of the present invention, there is provided a projection-type liquid crystal display apparatus according to the thirteenth aspect, further comprising a constant-current power source for supplying electric power to the transparent conductive film.

According to a fifteenth aspect of the present invention, there is provided a projection-type liquid crystal display apparatus according to any of the first to fourteenth aspect, wherein the heat generating performance of the transparent conductive film in the peripheral portion thereof is made to be stronger than that in the central portion thereof.

According to a sixteenth aspect of the present invention, there is provided a projection-type liquid crystal display apparatus according to the fifteenth aspect, wherein the transparent conductive film is formed by a mesh-shape conductive film having a mesh density which is low in the central portion thereof and high in the peripheral portion thereof.

According to a seventeenth aspect of the present invention, there is provided a projection-type liquid crystal display apparatus according to the fifteenth aspect, wherein the thickness of the transparent conductive film is small in the central portion of the transparent conductive film and large in the peripheral portion of the same.

According to an eighteenth aspect of the present invention, there is provided a projection-type liquid crystal display apparatus according to any one of the first to seventeenth aspects, wherein electrode portions for applying voltage to the transparent conductive film are connected to four corners of the transparent conductive film, and the drive means switches voltages which are respectively applied to the electrode portions.

According to a nineteenth aspect of the present invention, there is provided a projection-type liquid crystal apparatus according to any one of the first to seventeenth aspects, wherein the electrode portions for applying voltage to the transparent conductive film are connected to four corners of the transparent conductive film and central portions of opposite sides of the transparent conductive film, and the drive means switches voltages which are respectively applied to the electrode portions.

According to a twentieth aspect of the present invention, there is provided a projection-type liquid crystal display apparatus according to any one of the first to nineteenth aspects, wherein the liquid crystal light valve means has scanning electrodes and signal electrodes disposed in a matrix configuration, and the transparent conductive film is formed on only positions at which the transparent conductive film overlaps the scanning electrodes and signal electrodes disposed in the matrix configuration.

DESCRIPTION OF THE PREFEED EMBODIMENT OF THE INVENTION

Figure 1:
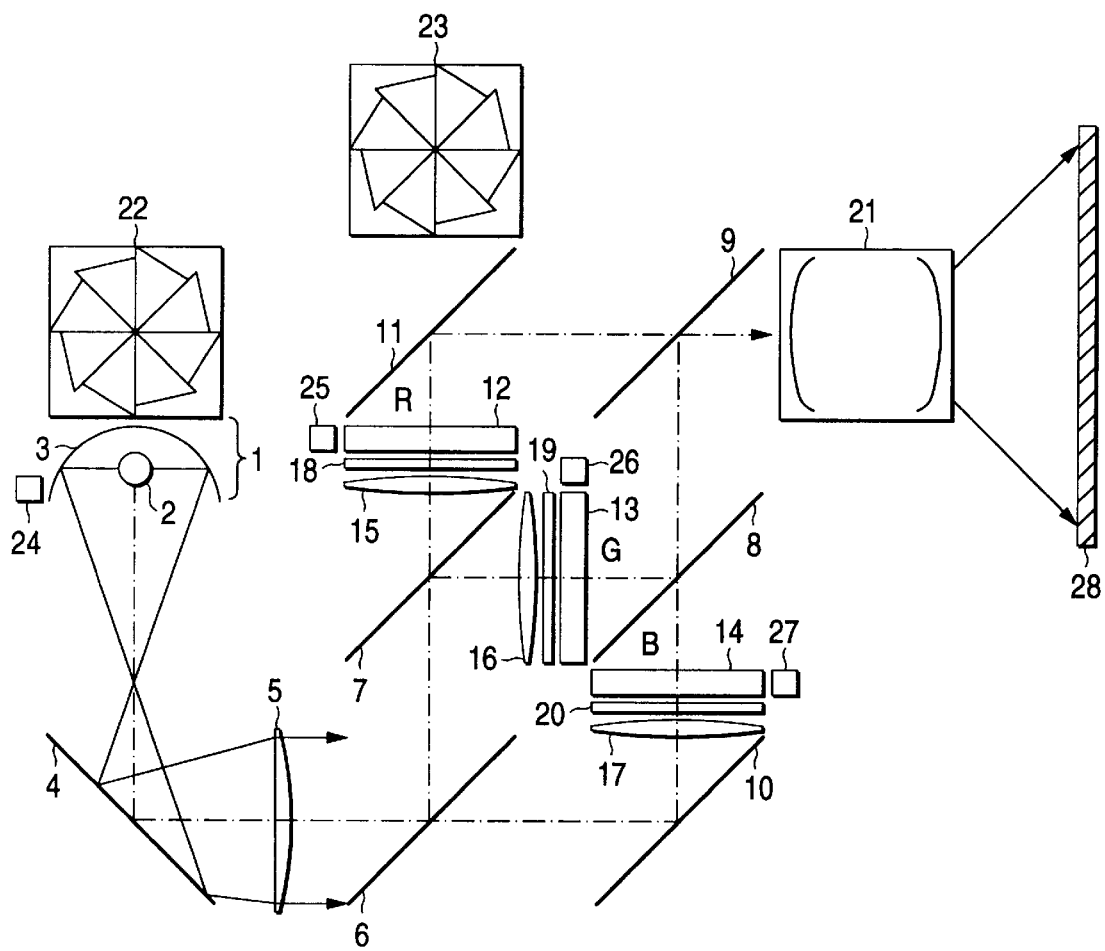
FIG. 1 is a structural view showing the structure of an optical system of a projection-type liquid crystal display apparatus according to a first embodiment of the present invention.

Embodiments of the present invention will now be described with reference to the accompanying drawings.
First Embodiment FIG. 1 is a structural-view schematically showing the structure of an optical system of a projection-type liquid crystal display apparatus according to a first embodiment of the present invention. As shown in FIG. 1, the projection-type liquid crystal apparatus according to the first embodiment comprises a light source 1 constituted by a white lamp 2 such as a metal halide lamp, xenon lamp or a halogen lamp and an elliptic mirror 3; a mirror 4 for reflecting a light beam emitted from the light source 1; and a collimator lens 5 for forming the light beam reflected by the mirror 4 into a parallel light beam.

The projection-type liquid crystal apparatus according to the first embodiment has, as a color separating optical system, a dichroic mirror 6 for permitting blue component (B) light to pass through and reflecting other component light and a dichroic mirror 7 for permitting red (R) component light to pass through and reflecting other component light. The projection-type liquid crystal apparatus according to the first embodiment has, as a color synthesizing optical system, a dichroic mirror 8 for permitting blue component light to pass through and reflecting other component light and a dichroic mirror 9 for permitting red component light to pass through and reflecting other component light.

Moreover, the projection-type liquid crystal apparatus according to the first embodiment has a mirror 10 for reflecting a blue component light beam allowed to pass through the dichroic mirror 6, a mirror 11 for reflecting a red component light beam, a field lens 15 for red (R) light, a field lens 16 for green (G) light, a field lens 17 for blue (B) light, a liquid crystal light valve (hereinafter called as "liquid crystal panel") 12 for red light, a liquid crystal panel 13 for green light, a liquid crystal panel 14 for blue light and a projection lens 21 for enlarging and projecting an image onto a screen 28. Note that liquid crystal for forming the liquid crystal panels 12, 13 and 14 is an LCPC material.

The projection-type liquid crystal apparatus according to the first embodiment has heater elements 18, 19 and 20 respectively disposed adjacent to the liquid crystal panels 12, 13 and 14 and on an optical path for the light beam emitted from the light source and each comprising a transparent conductive film, a light-source cooling fan 22 disposed adjacent to the light source 1, a liquid-crystal-panel cooling fan 23 disposed adjacent to the liquid crystal panels 12, 13 and 14, a temperature detector 24, such as a thermistor, for detecting the temperature of a position adjacent to the light source 1 and temperature detectors 25, 26 and 27 for respectively detecting the temperatures of the positions adjacent to the liquid crystal panels 12, 13 and 14.

In the projection-type liquid crystal apparatus having the above-mentioned structure and according to the first embodiment, a light beam emitted from the white lamp 2 is reflected by the elliptic mirror 3 and then converged. Then, the light beam is reflected by the mirror 4, and then made incident upon the collimator lens 5 so as to be converted into a parallel beam. The parallel beam is decomposed into three primary colors, that is, red, green and blue, by the dichroic mirrors 6 and 7. The light beams in the respective colors are allowed to pass through the corresponding field lenses 15, 16 and 17, and then allowed to pass through the heater elements 18, 19 and 20 so as to be made incident upon the liquid crystal panels 12, 13 and 14. The liquid crystal panels 12, 13 and 14 form monochrome images corresponding to the red, green and blue image signals by a drive circuit (not shown in FIG. 1).

Thus, transmitted red, green and blue light beams modulated by the monochrome images formed on the liquid crystal panels 12, 13 and 14 are again synthesized into one light beam by the dichroic mirrors 8 and 9, and then allowed to pass through the projection lens 21 so as to be converted into projection light which is enlarged and projected onto the screen 28. Thus, a color image is displayed. The field lenses 15, 16 and 17 convert the parallel beam into the converged light and enable the light beam to be efficiently made incident upon the projection lens 21.

Figure 2:
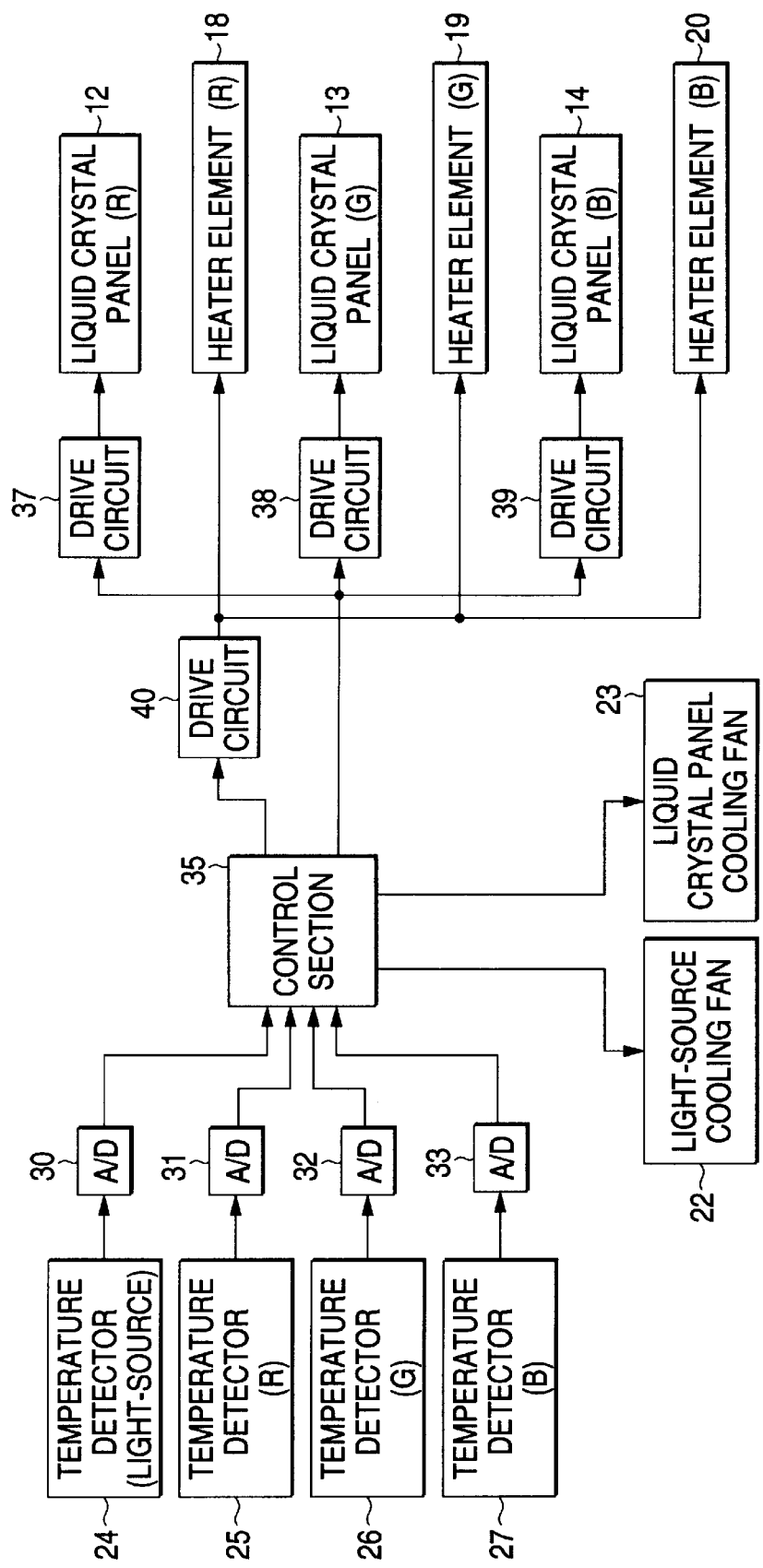
FIG. 2 is a block diagram showing the structure of a control system of the projection-type liquid crystal apparatus according to the first embodiment.

FIG. 2 is a block diagram showing the structure of a control system of the projection-type liquid crystal apparatus according to the first embodiment. Referring to FIG. 2, the same structures as those shown in FIG. 1 are given the same reference numerals. Reference numerals 30, 31, 32 and 33 respectively represent A/D converters for converting analog signals output from the temperature detectors 24, 25, 26 and 27 into digital signals. Reference numeral 37, 38 and 39 respectively represent drive circuits for respectively applying common voltages to common electrode of the liquid crystal panels 12, 13 and 14 and supplying an image signal (source voltage) to the source electrodes of the same. Reference numeral 35 represents a control unit for controlling the overall operation of the apparatus. Reference numeral 40 represents a drive circuit for applying voltages to the heater elements 18, 19 and 20.

The liquid crystal panels 12, 13 and 14 are structured to be operated with an alternating current. The drive circuits 37, 38 and 39 respectively, at each field or frame, invert the polarity of the common voltages which are applied to the common electrodes of the liquid crystal panels 12, 13 and 14 and that of the image signal which is supplied to the source electrode.

Figure 3:
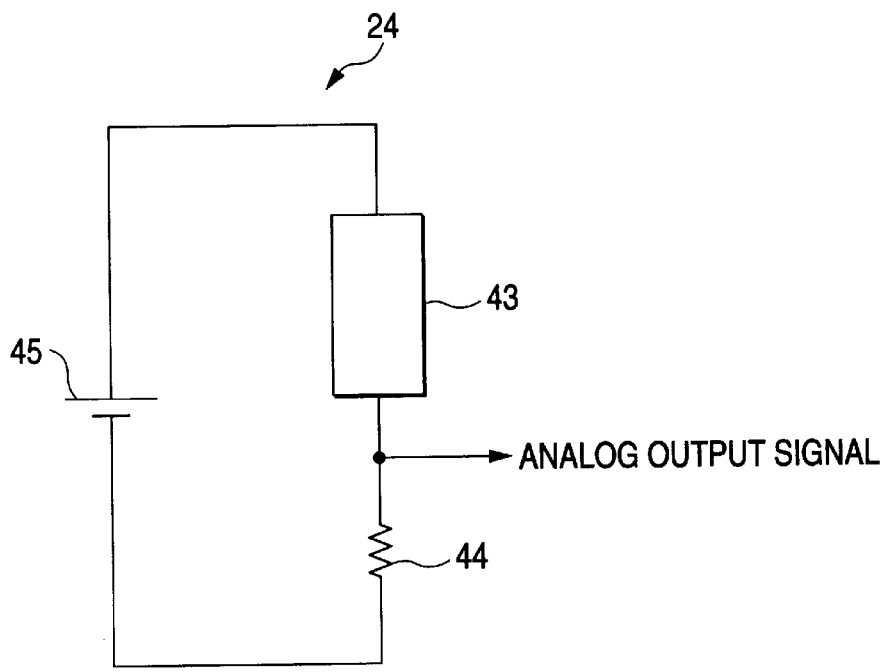
FIG. 3 is a circuit diagram schematically showing the structure of a temperature detector according to the first embodiment.

FIG. 3 is a circuit diagram schematically showing the structure of the temperature detector 24. As shown in FIG. 3, the temperature detector 24 has a resistor 43 having a resistance value which is considerably changed (that is, the resistance value has considerable temperature dependency) in accordance with the temperature, a resistor 44, in series, connected to the resistor 43 and having a resistance value which considerably depends upon the temperature and a DC power source 45 for applying a predetermined voltage to the two ends of the resistor 43 and the resistor 44 which are in series connected to each other. The resistor 44 has a substantially constant resistance value measured previously, while the resistor 43 has a characteristic between the temperatures and the resistance values measured previously. Note that the temperature detectors 25, 26 and 27 shown in FIGS. 1 and 2 have the same structure as that of the temperature detector 24.

Figure 4:
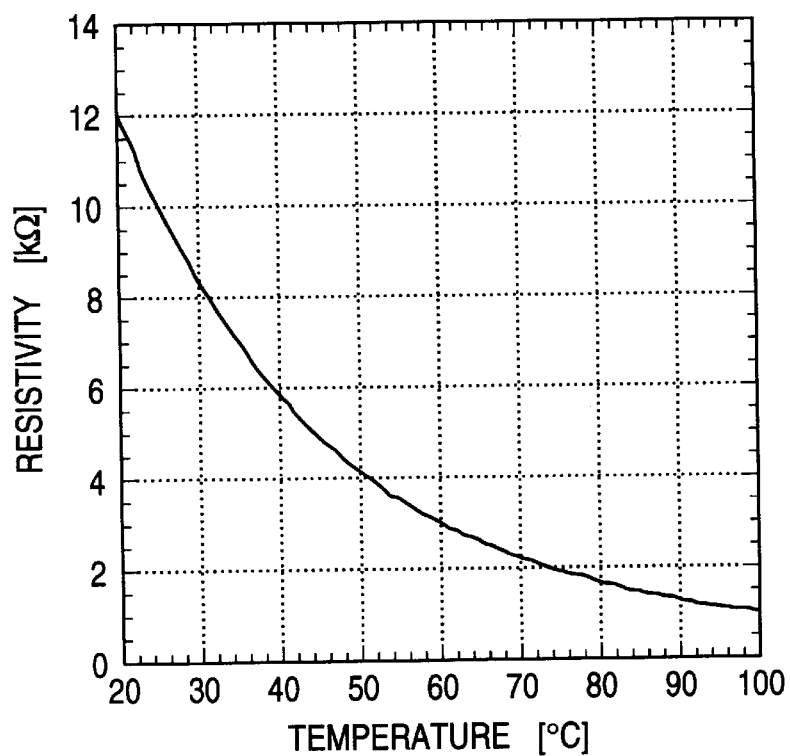
FIG. 4 is a graph showing an example of a characteristic between temperatures [° C.] and resistance values [kΩ] of a resistor 43 shown in FIG. 3.

FIG. 4 is a graph showing an example the characteristic between temperatures [° C.] and resistance values [kΩ] of the resistor 43 shown in FIG. 3. The temperature detector 24 is arranged to output the potential of a point (the middle point) at which the resistor 43 and the resistor 44 are connected to each other, the output being in the form of an analog signal. The analog is changed to correspond to the resistance value of the resistor 43 which is changed in accordance with the temperature. Note that also the temperature detectors 25, 26 and 27 shown in FIGS. 1 and 2, similarly to the temperature detector 24, output analog signals.

As shown in FIG. 2, the analog signals output from the temperature detectors 24, 25, 26 and 27 are converted into digital signals by the A/D converters 30, 31, 32 and 33, and then supplied to the control section 35. The control section 35 controls the cooling performance of the light-source cooling fan 22 in accordance with a value detected by the temperature detector 24 which detects the temperature of a position adjacent to the light source 1. Moreover, the control section 35 controls the cooling performance of the liquid-crystal-panel cooling fan 23 in accordance with values detected by the temperature detectors 25, 26 and 27 for respectively detecting the temperatures of the positions adjacent to the liquid crystal panels 12, 13 and 14.

Figure 5:
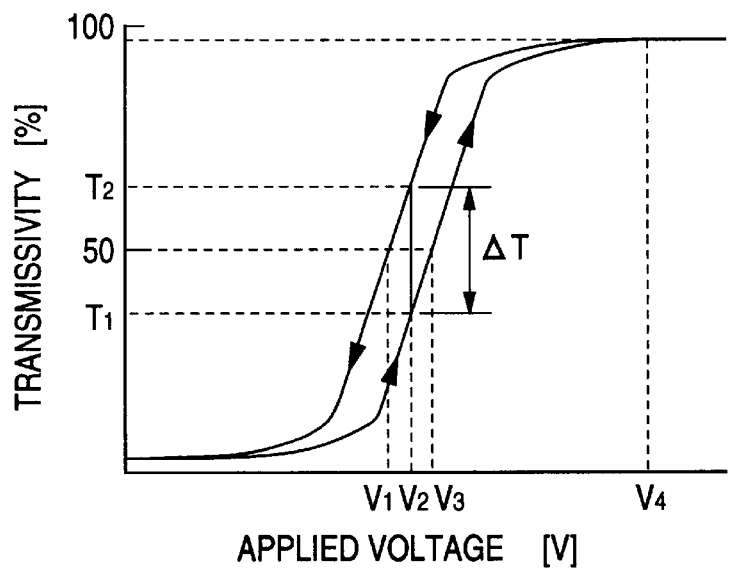
FIG. 5 is a graph showing a characteristic between applied voltages [V] and light transmissivity [%} of the liquid crystal panel made of an LCPC material.

FIG. 5 is a graph showing the characteristic of the relationship between applied voltages [V] and light transmissivity [%] of a liquid crystal panel made of the LCPC material. As shown in FIG. 5, the foregoing liquid crystal panel has a characteristic such that the light transmissivity is the lowest (that is, normally black) when the applied voltage is 0 [V] and the light transmissivity is raised as the applied voltage is raised. In a state where the applied voltage is being raised, the transmissivity is made to be 50 [%] when the voltage is $V_3$ as shown in FIG. 5. In the state where the voltage is being. lowered, the transmissivity is made to be 50 [%] when the voltage is $V_1$. Therefore, even if the same voltage is applied, for example, voltage $V_1$ (=$(V_1+V_3)/2$) which is the middle point of $V_1$ and $V_3$ is applied, the transmissivity is made to be $T_1$ in a state where the applied voltage is being raised. The transmissivity is made to be $T_2$ in a state where the applied voltage is being raised. That is, the same applied voltage results in different transmissivity values depending upon the state of the change. Hereinafter, change $\Delta T$ of the transmissivity $T_1$ and $T_2$ under the constant temperature environment is called hysteresis $\Delta T$.

The hysteresis $\Delta T$ is enlarged when the operation is performed when the temperature is, for example, lower than the optimum operation level. Thus, the quality of the image is affected considerably. Thus, a fact is shown that the quality is adversely affected in a case where the image forming surface of the liquid crystal panel is lower than the optimum operation temperature, that is, in a state where the ambient temperature of the apparatus is very low, and in a case where the image forming surface of the liquid crystal panel has not been heated satisfactorily as in a case where the apparatus has been turned on even if the ambient temperature of the apparatus is not considerably low.

Figure 6:
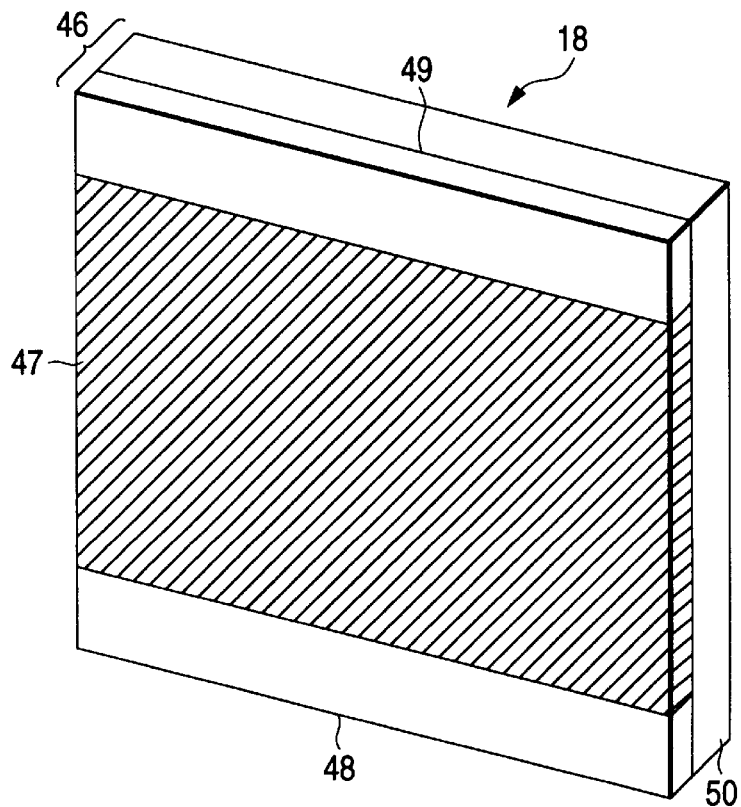
FIG. 6 is a perspective view schematically showing the structure of a heater element according to the first embodiment.

FIG. 6 is a perspective view schematically showing the structure of the heater element 18 according to the first. embodiment. As shown in FIG. 6, the heater element 18 has a transparent substrate 50, a transparent conductive film 47 formed on the transparent substrate 50 and connecting electrodes 48 and 49 formed on the transparent substrate 50 and respectively connected to the two opposite sides of the transparent conductive film 47. It is preferable that the transparent conductive film 47 is formed such that indium tin oxide (ITO) film is formed by an evaporation method, a sputtering method or a spraying method on the transparent substrate 50. Since ITO is able to form the transparent conductive film 47 having low specific resistance and high transmissivity permitted for visible rays, ITO is a suitable material in view of obtaining satisfactory efficiency to use light and enabling a large electric power to be supplied to the transparent conductive film 47. The heater element 18 is disposed adjacent to the liquid crystal light valve 12 or to be in contact with the liquid crystal light valve 12. When voltages are applied to the connecting electrodes 48 and 49 at the two ends of the transparent conductive film 47, the transparent conductive film 47 is caused to generate heat. Thus, the image forming surface of the liquid crystal light valve 12 disposed adjacent to the transparent conductive film 47 or to be in contact with the same is heated.

The heater elements 19 and 20 have the same structure as that of the heater element 18 and are disposed adjacent to the liquid crystal panels 13 and 14 or in contact with the liquid crystal panels 13 and 14. Also the heater elements 19 and 20 are structured such that the transparent conductive film 47 is caused to generate heat when voltages are applied to the connecting electrodes 48 and 49 at the two ends of the transparent conductive film 47. Thus, the image forming surfaces of the liquid crystal panels 13 and 14 disposed adjacent to the transparent conductive film 47 or in contact with the same are heated.

The control section 35 determines that the temperatures of the image forming surfaces of the liquid crystal panels 12, 13 and 14 are lower than the optimum operation temperature if detected temperatures (for example, an average value of temperatures detected by the temperature detectors 25, 26 and 27) corresponding to values detected by the temperature detectors 25, 26 and 27 are lower than a predetermined reference value, and then supplies a control signal to the drive circuit 40 for the liquid crystal panels 12, 13 and 14. The drive circuit 40 of the liquid crystal panels 12, 13 and 14 applies the voltage corresponding to the control signal to the transparent conductive film 47 of the heater elements 18, 19 and 20 to heat the liquid crystal panels 12, 13 and 14. If the temperatures (an average value of temperatures detected by the temperature detectors 25, 26 and 27) detected by the temperature detectors 25, 26 and 27 are higher than a predetermined temperature, a determination is made that the temperatures of the image forming surfaces of the liquid crystal panels 12, 13 and 14 are higher than the optimum operation temperature. Thus, a control signal is supplied to the drive circuit 40 of the liquid crystal panels 12, 13 and 14. The drive circuit 40 for the liquid crystal panels 12, 13 and 14 applied the voltage corresponding to the control signal to the heater elements 18, 19 and 20 (makes the applied voltage to be lowered or to be zero) so that the degree of heating of the liquid crystal panels 12, 13 and 14 is lowered or they are not heated.

As described above, the projection-type liquid crystal apparatus according to the first embodiment is structured such that the liquid crystal panels 12, 13 and 14 are heated by the heater elements 18, 19 and 20. Therefore, even if the apparatus is placed under a low temperature environment, the image forming surfaces of the liquid crystal panels 12, 13 and 14 can be raised to the optimum operation temperature in a short time. Therefore, deterioration in the quality of the image occurring due to the hysteresis phenomenon and reduction in the response speed in a state of a low temperature operation can be prevented which has raised a problem in a case where the image forming surfaces of the liquid crystal panels 12, 13 and 14 are lower than the optimum operation temperature, that is, if the ambient temperature of the apparatus is considerably low or the image forming surfaces of the liquid crystal panels 12, 13 and 14 have not been heated satisfactorily.

Second Embodiment

Figure 7:
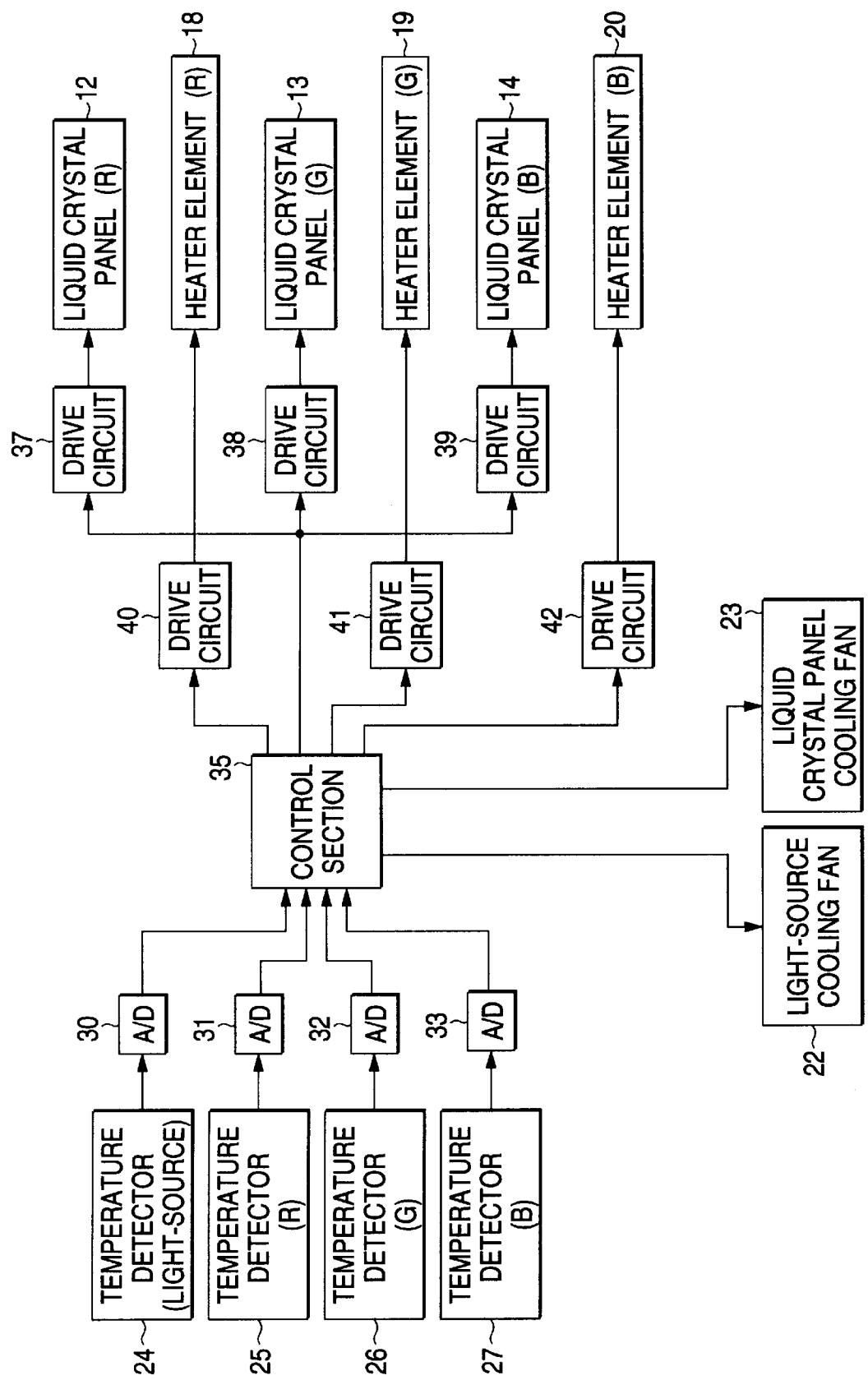
FIG. 7 is a block diagram showing the structure of a control system of a projection-type liquid crystal apparatus according to a second embodiment of the present invention.

FIG. 7 is a block diagram showing the structure of a control system of a projection-type liquid crystal display apparatus according to a second embodiment of the present invention. Referring to FIG. 7, the same or corresponding structures to those shown in FIG. 2 are given the same reference numerals. The projection-type liquid crystal apparatus according to the second embodiment is different from that according to the first embodiment in that the heater elements 18, 19 and 20 are operated by corresponding drive circuits 40, 41 and 42 and in the contents of control performed by the control unit 35.

Specifically, the projection-type liquid crystal apparatus according to the second embodiment, as shown in FIG. 7, is arranged to individually control the heat generating performance of each of the heater elements 18, 19 and 20 in accordance with values respectively detected by the temperature detectors 25, 26 and 27 for detecting the temperatures of the positions adjacent to the liquid crystal panels 12, 13 and 14 in order to make the light transmissivity of each of the liquid crystal panels 12, 13 and 14 to be an optimum value.

As described above, the projection-type liquid crystal apparatus according to the second embodiment has the structure such that the drive circuits 40, 41 and 42, which have received the control signal supplied from the control unit 35 in accordance with values detected by the temperature detectors 25, 26 and 27, respectively set the heat generating performance levels of the heater elements 18, 19 and 20. Therefore, the undesirable shift of the light transmissivity occurring due to the difference in the temperatures of the liquid crystal panels 12, 13 and 14 can arbitrarily be compensated. Therefore, a problem can be prevented which arises in that, for example, the temperature of the image forming surface of a liquid crystal panel adjacent to a heat source, such as the light source 1, is made to be higher than that of the image forming surface of another liquid crystal panel or that the temperature of the image forming surface of a liquid crystal panel adjacent to the liquid-crystal-panel cooling fan 23 is made to be lower than that of the image forming surface of another liquid crystal panel. As a result, an excellent image can be displayed.

When the ambient temperature of the apparatus is low or the image forming surface of the liquid crystal panel has not been heated satisfactorily as in the case where the apparatus has been turned on, heating can be performed by the heater elements 18, 19 and 20 in consideration of the difference in the temperatures among the liquid crystal panels 12, 13 and 14. Therefore, a problem can be overcome in that the characteristic between the applied voltages and transmissivity is different among the liquid crystal panels 12, 13 and 14 and thus the quality of the image is adversely affected. Therefore, the projection-type liquid crystal apparatus according to the second embodiment is able to display an excellent image regardless of the ambient temperature or even immediately after the apparatus has been turned on.

The other structures of the second embodiment are the same as those according to the first embodiment.

Third Embodiment

Figure 8:
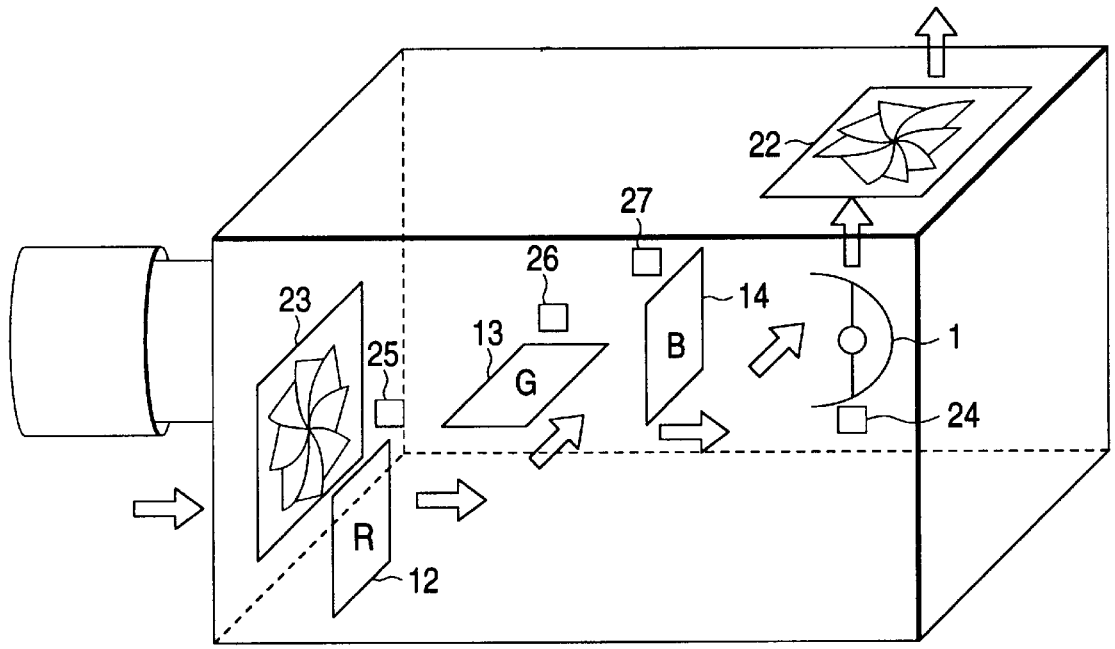
FIG. 8 is a view of explanatory schematically showing a wind path in a projection-type liquid crystal apparatus according to a third embodiment of the present invention.

FIG. 8 is a view of explanatory schematically showing an air duct (a course through which air flows) in the projection-type liquid crystal apparatus according to a third embodiment of the present invention. The projection-type liquid crystal apparatus according to the third embodiment has the same structure as that of the apparatus shown in FIG. 2. Therefore, the third embodiment will be described as well as with reference to FIG. 2. Referring to FIG. 8, the same or corresponding structures to those shown in FIG. 2 are given the same reference numerals.

The projection-type liquid crystal apparatus according to the third embodiment is arranged such that when temperatures (for example, an average value of temperatures detected by the temperature detectors 25, 26 and 27) detected by the temperature detectors 25, 26 and 27 are lower than a predetermined reference temperature $t_1$, the heat generating performance of the heater elements 18, 19 and 20 is improved to heat the image forming surfaces of the liquid crystal panels 12, 13 and 14 and the operation of the liquid-crystal-panel cooling fan 23 is interrupted. If the temperatures detected by the temperature detectors 25, 26 and 27 are higher than the predetermined reference temperature $t_1$ and lower than another reference temperature $t_2$ ($t_1 < t_2$), the heat generating performance of the heater elements 18, 19 and 20 is raised to heat the image forming surface of the liquid crystal panels 12, 13 and 14 and the liquid-crystal-panel cooling fan 23 is operated to form an air flow in a direction indicated by a white arrow shown in FIG. 8. When the temperatures detected by the temperature detectors 25, 26 and 27 are made to be higher than the specific temperature $t_2$, the heat generating performance of the heater elements 18, 19 and 20 is lowered or the heat generating operation is interrupted with the liquid-crystal-panel cooling fan 23 being operated. Thus, the image forming surfaces of the liquid crystal panels 12, 13 and 14 are maintained at the optimum operation temperatures.

The heater elements 18, 19 and 20 for heating the overall image forming surfaces of the liquid crystal panels 12, 13 and 14 may be directly applied to the image forming surfaces of the liquid crystal panels 12, 13 and 14 or formed as shown in FIG. 6 (the transparent conductive film 47 is evaporated to the transparent substrate 50). If the temperatures of the heater elements 18, 19 and 20 are irregular, the light transmissivity of each of the liquid crystal panels 12, 13 and 14 is made to be nonuniform and thus the projected image has irregularity of the illuminance. In particular, the difference in the illuminance between the central portion and the peripheral portion occurring due to the fact that only the central portion of each of the liquid crystal panels 12, 13 and 14 is heated usually allows the quality of the image to deteriorate excessively. The projection-type liquid crystal apparatus according to the third embodiment has the arrangement such that the image forming surfaces of the liquid crystal panels 12, 13 and 14 are quickly raised to the optimum operation temperatures in a short time. Moreover, air flows blown from the liquid-crystal-panel cooling fan 23 toward the liquid crystal panels 12, 13 and 14 prevents irregular temperatures on the image forming surfaces of the liquid crystal panels 12, 13 and 14 occurring due to irregular heating of the heater elements 18, 19 and 20. Therefore, the projection-type liquid crystal apparatus according to the third embodiment is able to prevent irregular illuminance of the projected image occurring because of the irregular temperatures of the liquid crystal panels 12, 13 and 14.

The other structures of the third embodiment are the same as those of the first embodiment. The control according to the third embodiment may be applied to the apparatus according to the second embodiment.

Fourth Embodiment

A projection-type liquid crystal display apparatus according to a fourth embodiment of the present invention is the same as the apparatus shown in FIG. 2 except for the contents of control performed by the control section 35. Therefore, the fourth embodiment will be described with reference to FIG. 2.

The projection-type liquid crystal apparatus according to the fourth embodiment is arranged such that the heat generating performance of each of the heater elements 18, 19 and 20 for heating the liquid crystal panels 12, 13 and 14 is controlled by total sum D (t)(Equation (1) obtained by multiplying values $D_r(t_r)$, $D_g(t_g)$ and $D_b(t_b)$ detected by the temperature detectors 25, 26 and 27 with weighting coefficients $k_r$, $k_g$ and $k_b$:

$$D(t) = k_r D_r(t_r) + k_g D_g(t_g) + k_b D_b(t_b) \quad (1)$$

In Equation (1), $t_r$, $t_g$ and $t_b$ respectively are temperatures detected by the temperature detectors 25, 26 and 27, and t is a temperature representing temperatures detected by the temperature detectors 25, 26 and 27. The weighting coefficients, $k_r$, $k_g$ and $k_b$ are values, for example, 0.30, 0.59 or 0.11 in which the ratio of green, which most considerably affects the quality of the image.

Since the projection-type liquid crystal apparatus according to the fourth embodiment is able to control the temperatures of the image forming surfaces of the liquid crystal panels 12, 13 and 14 in consideration of the color balance, in particular, excellent white balance can be realized.

Although the foregoing descriptions have been performed about the structure in which the temperature detectors 25, 26 and 27 are respectively disposed adjacent to the liquid crystal panels 12, 13 and 14, a plurality of temperature detectors may be attached adjacent to one liquid crystal panel to control the heat generation performed by the heater device in consideration of the temperature distribution in each of the image forming surfaces of the liquid crystal panels.

The other structures of the fourth embodiment are the same as those according to the first embodiment. The control according to the forth embodiment may be applied to the apparatus according to the second embodiment or the third embodiment.

Fifth Embodiment

A projection-type liquid crystal apparatus according to a fifth embodiment is the same as that shown in FIG. 2 except for the contents of control which is performed by the control section 35. Therefore, the description of the fifth embodiment is performed with reference to FIG. 2.

The projection-type liquid crystal apparatus according to the fifth embodiment is arranged such that if the ambient temperature of the apparatus is very low or the image forming surfaces of the liquid crystal panels 12, 13 and 14 have not been heated satisfactorily as in the case where the apparatus has been turned on even if the ambient temperature is not considerably low, the heater elements 18, 19 and 20 heat the image forming surfaces of the liquid crystal panels 12, 13 and 14. After determination has been performed in accordance with the temperatures (for example, an average value of the temperatures detected by the temperature detectors 25, 26 and 27) detected by the temperature detectors 25, 26 and 27 that the image forming surfaces of the liquid crystal panels 12, 13 and 14 for red, green and blue have been heated to the optimum operation temperatures, the heat generating performance of each of the heater elements 18, 19 and 20 is lowered.

Specifically, analog output signals from the temperature detectors 25, 26 and 27 are converted into digital signals by the A/D converters 31, 32 and 33, and then supplied to the control section 35. The signals supplied to the control section 35 are used control signals for changing the heat generating performance of each of the heater elements 18, 19 and 20, and then supplied to the drive circuit 40. In accordance with the supplied control signals, the drive circuit 40 change the heat generating performance of each of the heater elements 18, 19 and 20.

If absolute value $|D(t)-D(t-\Delta t)|$ is larger than predetermined reference value $D_{th}$ in a case where the values (for example, an average value of values detected by the temperature detectors 25, 26 and 27) detected by the temperature detectors 25, 26 and 27 have been changed from D (t−Δt) to D (t) in a unit period of time (for example, Δt seconds) after the heat generating performance has been lowered, that is, if the temperatures of the image forming surfaces of the liquid crystal panels 12, 13 and 14 are expected to be lower than the optimum operation temperature because of the drop of the heat generating performance of each of the heater elements 18, 19 and 20, the heat generating performance of each of the heater elements 18, 19 and 20 is raised in accordance with the detected value D (t) at that time. If the absolute value is not larger than the reference value $D_{th}$, the heat generating performance of each of the heater elements 18, 19 and 20 is not changed and the same is fixed.

$$|D(t)-D(t-\Delta t)|>D_{th} \quad (2)$$

The detected value D (t') when the heat generating performance of each of the heater elements 18, 19 and 20 has been finally changed is stored. The above-mentioned control for fixing the heat generating performance of each of the heater elements 18, 19 and 20 is repeated several times (for example, (10 x Δt) seconds after repetition of the control by ten times). Then, the absolute value $|D(t)-D(t')|$ of the amount of change from the detected value D (t) to D (t') is larger than a predetermined reference value $D_{th}'$, the heat generating performance of each of the heater elements 18, 19 and 20 is raised in accordance with the reference value D (t) at that time. If the absolute value is smaller than the reference value $D_{th}'$, the heat generating performance of the heater elements is not changed and the same is fixed.

$$|D(t)-D(t')|>D_{th}' \quad (3)$$

In a case where the heat generating performance of the heater elements has been changed in accordance with the detected value D (t), the control indicated with Equation (2) is performed. In a case where the heat generating performance of the heater elements has not been changed, the control indicated with Equation (3) is repeated at each unit time.

The projection-type liquid crystal apparatus according to the fifth embodiment is able to prevent change in the illuminance occurring because of small change of the temperatures of the image forming surfaces of the liquid crystal panels at short periods.

The other structures of the fifth embodiment are the same as those according to the first embodiment. The control according to the fifth embodiment may be applied to the apparatuses according to any one of the second to fourth embodiments.

Sixth Embodiment

A projection-type liquid crystal apparatus according to a sixth embodiment is the same as that shown in FIG. 2 except for the contents of control which is performed by the control section 35. Therefore, the sixth embodiment will be described as well as with reference to FIG. 2.

Figure 9:
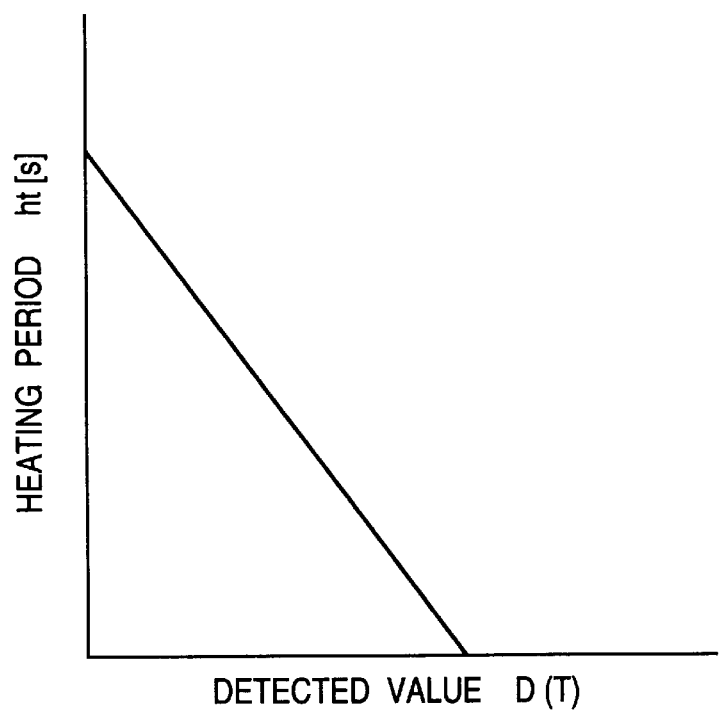
FIG. 9 is a graph showing an example of the relationship between values D (T) detected by a temperature detector and hating time of a projection-type liquid crystal apparatus according to a sixth embodiment of the present invention.

The projection-type liquid crystal apparatus according to the sixth embodiment of the present invention is arranged such that when the image forming surfaces of the liquid crystal panels 12, 13 and 14 have not been heated to the optimum operation temperatures, the heater elements 18, 19 and 20 are operated to heat the image forming surfaces of the liquid crystal panels 12, 13 and 14. The control unit 35 determines the heat generating performance of the heater elements 18, 19 and 20 and heating period of time $h_t$ [seconds] in accordance with values D (T) (for example, an average value of values detected by the temperature detectors 25, 26 and 27) detected by the temperature detectors 25, 26 and 27 for detecting the temperatures of positions adjacent to the liquid crystal panels 12, 13 and 14. FIG. 9 is a graph showing an example of heating periods of time with respect to values D (T) detected by the temperature detectors 25, 26 and 27. As shown in FIG. 9, the detected value D (T) and the heating period of time $h_t$ have a relationship in the form of a linear function in order to shorten the period of time $h_t$ as the values D (T) detected by the temperature detectors 25, 26 and 27 is enlarged. Since the heat generating performance of each of the heater elements 18, 19 and 20 is raised by the period of time $h_t$ obtained in accordance with the temperatures of the positions adjacent to the liquid crystal panels 12, 13 and 14 when the apparatus is turned on to previous heat the image forming surfaces of the liquid crystal panels 12, 13 and 14 to the optimum operation temperatures, the liquid crystal panels 12, 13 and 14 can be made to the optimum operation temperatures in a short time even if the apparatus is used in a low temperature environment. Thus, an excellent image can be displayed.

Although the control method has been described in which the detected values D (T) and the heating period of time $h_t$ have the linear function relationship, the control method is not limited to this. For example, a memory having control values of the temperatures detected by the temperature detectors 25, 26 and 27 for detecting the temperatures of the positions adjacent to the liquid crystal panels 12, 13 and 14 may be added to individually control the heater elements 18, 19 and 20 to make the temperatures of the liquid crystal panels 12, 13 and 14 to the optimum operation temperatures.

The other structures of the sixth embodiment are the same as those according to the first embodiment. The control according to the sixth embodiment may be applied to the apparatus according to any one of the second to fifth embodiments.

Seventh Embodiment

Figure 10:
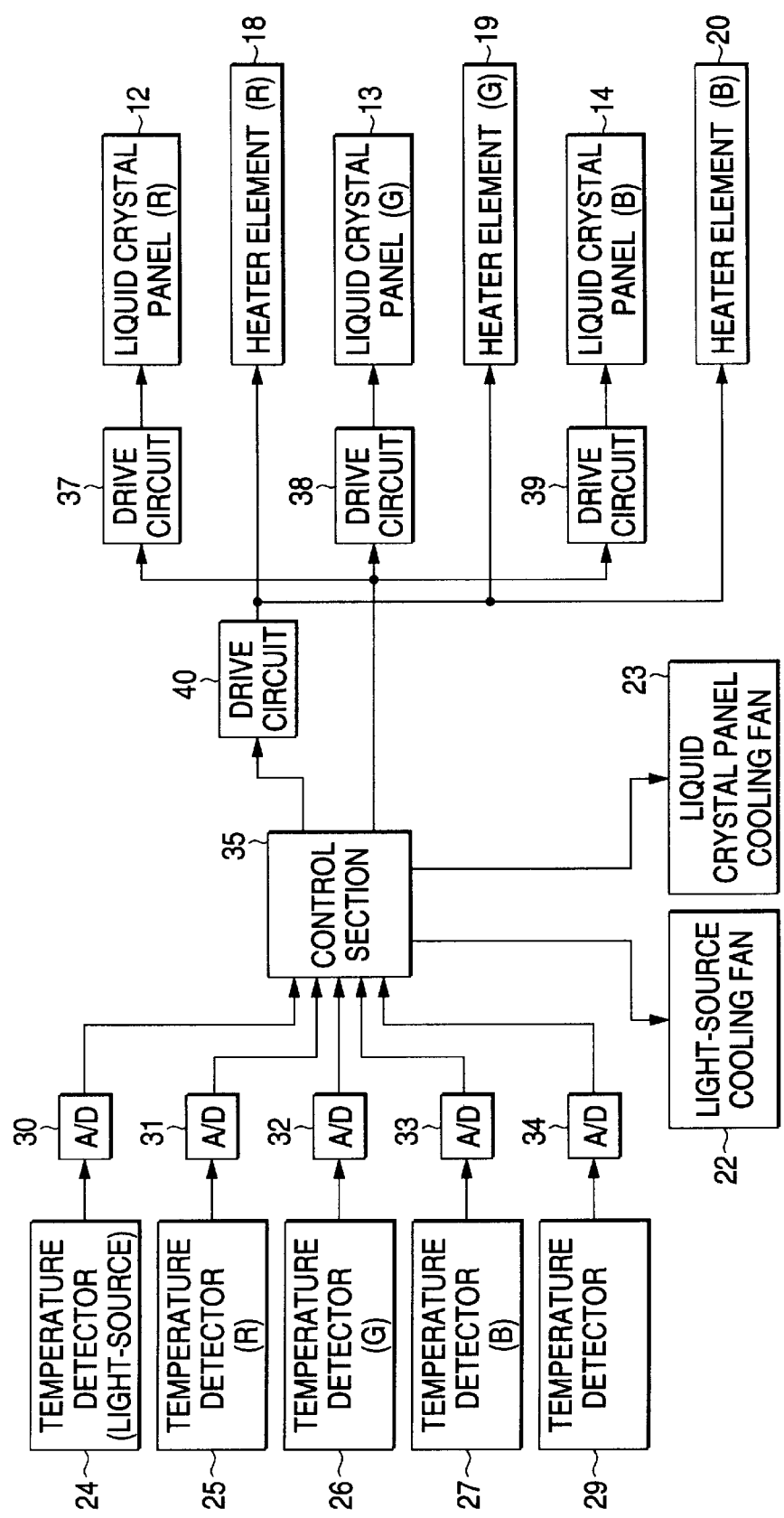
FIG. 10 is a block diagram showing the structure of a control system of a projection-type liquid crystal apparatus according to a seventh embodiment of the present invention.

FIG. 10 is a block diagram showing the structure of a control system of a projection-type liquid crystal apparatus according to a seventh embodiment of the present invention. Referring to FIG. 10, the same or corresponding structures to those shown in FIG. 2 are given the same reference numerals. The projection-type liquid crystal apparatus according to the seventh embodiment is different from the first embodiment in that a temperature detector 29 for detecting the environment temperature of the outside portion of the apparatus and an A/D converter 34 for converting the output from the temperature detector 29 into a digital signal are provided and in the contents of control which is performed by the control section 35.

Figure 11:
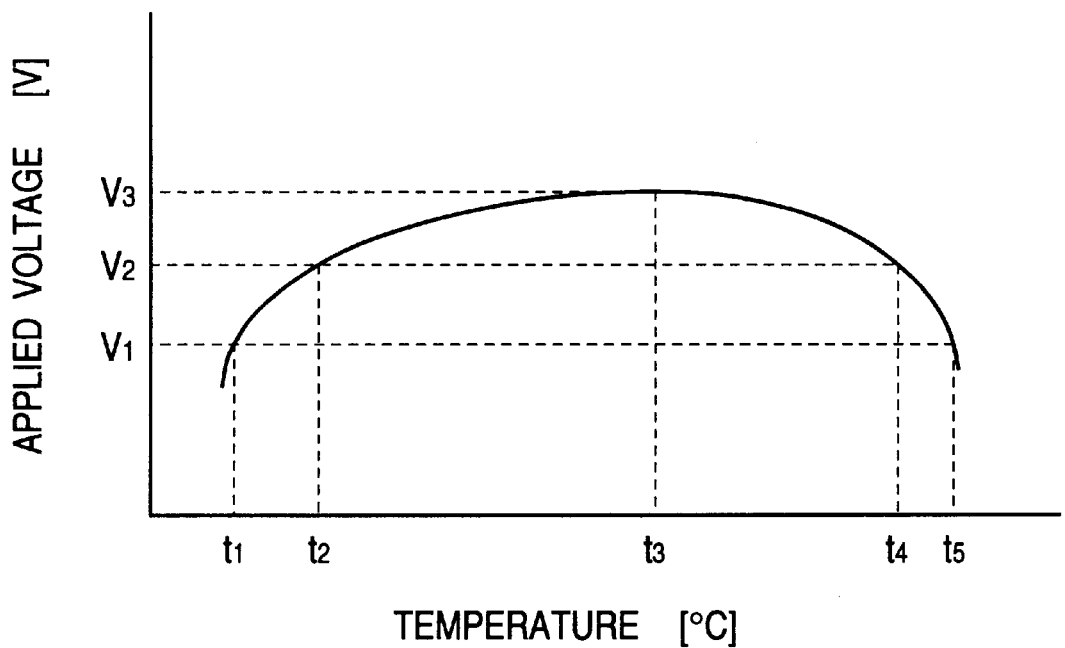
FIG. 11 is a graph showing change in applied voltage $V_{th50}$ with which the light transmissivity of the liquid crystal panel made of the LCPC material is made to be 50% by the temperature of the liquid crystal panel.

FIG. 11 is a graph showing the characteristic (hereinafter called $V_{th50}$-characteristic) for changing the applied voltage $V_{th50}$ with which the light transmissivity of a liquid crystal panel made of the LCPC material is made to be 50 [%] is changed in accordance with the temperatures of the liquid crystal panels. As shown in FIG. 11, the applied value $V_{th50}$ for making the light transmissivity to be 50 [%] is $V_1$ when the temperature is $t_1$ or $t_5$ and the same is $V_2$ when the temperature is $t_2$ or $t_4$. When the temperature is $t_3$, the applied temperature is the highest value of $V_3$ when the temperature is $t_3$. That is, as can be understood from FIG. 11, the light transmissivity of the liquid crystal panel made of the LCPC material is the lowest (because $V_{th50}$ is high) when the applied voltage is constant. As the temperature is made to be higher than $t_3$ or as the temperature is made to be lower than the same, the light transmissivity is raised (because $V_{th50}$ is low). The foregoing temperatures $t_1$ to $t_5$ are optimum operation temperatures for the liquid crystal panels.

The projection-type liquid crystal apparatus according to the seventh embodiment is arranged such that if the temperature detected by the temperature detector 29 for detecting the environmental temperature on the outside of the apparatus is lower than a predetermined reference value, the heat generating performance of each of the heater elements 18, 19 and 20 is raised to heat the image forming surfaces of the liquid crystal panels 12, 13 and 14. If the temperatures detected by the temperature detectors 25, 26 and 27 adjacent to the liquid crystal panels have reached $t_1$ and then the same have reached $t_3$, the operations of the heater elements 18, 19 and 20 are interrupted. If the temperatures detected by the temperature detectors 25, 26 and 27 adjacent to the liquid crystal panels have been made to be lower than $t_1$, the heater elements 18, 19 and 20 are operated.

Since the operations of the heater elements 18, 19 and 20 are controlled as described above, the temperatures of the image forming surfaces of the liquid crystal panels 12, 13 and 14 can be maintained at the optimum operation temperatures.

The projection-type liquid crystal apparatus according to the seventh embodiment is structured such that if a determination has been made in accordance with the values (for example, an average value of values detected by the temperature detectors 25, 26 and 27) detected by the temperature detectors 25, 26 and 27 that the temperatures of the image forming surfaces of the liquid crystal light valve 12 have been heated to the optimum operation temperatures, the degree of lowering of the heat generating performance of each of the heater elements 18, 19 and 20 is determined in accordance with the value detected by the temperature detector 29. The reason for this is that if the ambient temperature is low, the heat generating performance of each of the heater element 18 is not lowered considerably. If the ambient temperature is high, the heat generating performance of each of the heater element 18 is lowered to maintain the temperatures of the image forming surfaces of the liquid crystal panels 12, 13 and 14 at the optimum operation temperatures.

Since the projection-type liquid crystal apparatus according to the seventh embodiment is arranged such that the control section 35 controls the heat generating performance of each of the heater elements 18, 19 and 20 in accordance with a value detected by the temperature detector 29 for detecting the temperature on the outside of the apparatus and values detected by the temperature detectors 25, 26 and 27 disposed adjacent to the liquid crystal panels 12, 13 and 14, the image forming surfaces of the liquid crystal panels 12, 13 and 14 can quickly be made to a constant state (the optimum operation temperature temperatures).

The other structures of the seventh embodiment are the same as those according to the first embodiment. Moreover, the control according to the seventh embodiment may be applied to the apparatus according to any one of the second to sixth embodiments.

Eighth Embodiment

Figure 12:
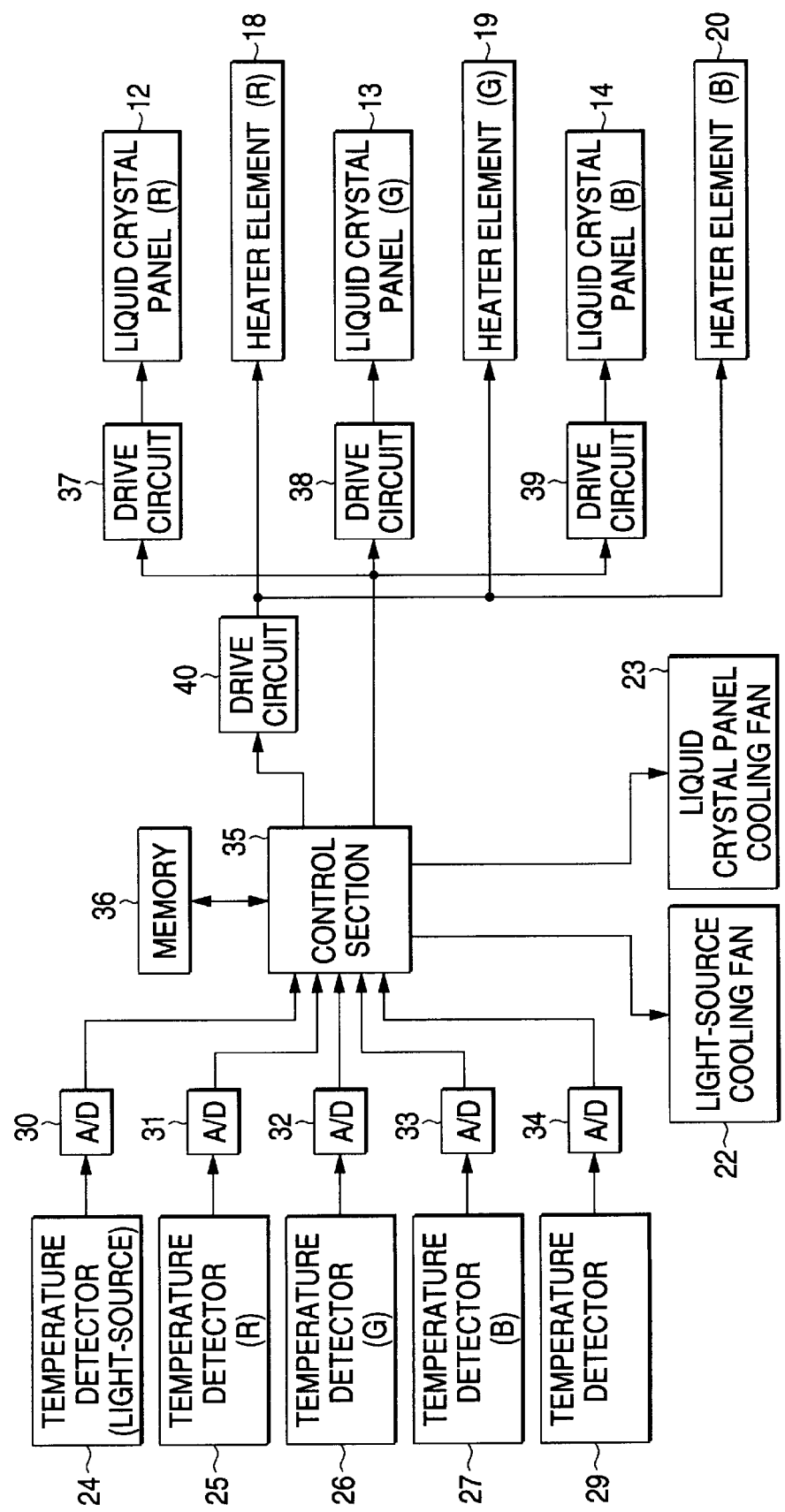
FIG. 12 is a block diagram showing the structure of a control system of a projection-type liquid crystal apparatus according to an eighth embodiment of the present invention.

FIG. 12 is a block diagram showing the structure of a control system of a projection-type liquid crystal apparatus according to an eighth embodiment of the present invention. Referring to FIG. 12, the same or corresponding structures to those shown in FIG. 2 are given the same reference numerals. The projection-type liquid crystal apparatus according to the eighth embodiment is different from the apparatus according to the first embodiment in the temperature detector 29 for detecting the environment temperature of the outside of the apparatus, the A/D converter 34 for converting an output from the temperature detector 29 into a digital signal and the memory 36 being provided and in the contents of control which is performed by the control section 35.

The projection-type liquid crystal apparatus according to the eighth embodiment is structured such that value ($t_{out}$) detected by the temperature detector 29 for detecting the temperature of the outside portion of the apparatus and values (for example, an average value D ($t_{ave}$) of values detected by the temperature detectors 25, 26 and 27) detected by the temperature detectors 25, 26 and 27 for detecting the temperatures of the positions adjacent to the liquid crystal panels 12, 13 and 14 are used as keys which are supplied to the memory 36 through the control unit 35. The memory 36 previously stores, for examples, as shown in the following Table 1, the two input values (D ($t_{out}$) and D ($t_{ave}$)) and data of heating periods of time for maintaining the heat generating performance of each of the heater elements 18, 19 and 20 at a high level in the form of a two-dimensional table (Table 1). When the apparatus is turned on, data corresponding to the value D ($t_{out}$) detected by the temperature detector 29 and the average value D ($t_{ave}$) of values detected by the temperature detectors 25, 26 and 27 is read from the memory 36. Then, the heat generating performance of each of the heater elements 18, 19 and 20 is maintained at high heat generating performance for only a period of time in accordance with data above. Thus, the temperatures of the image forming surfaces of the liquid crystal panels 12, 13 and 14 are raised to the optimum operation temperatures.

TABLE 1

| $\frac{D(t_{ave})}{D}$ (t_out) ..., | 20 | 21 | 22 | 23 | 24 | 25 | 26 | 27 | 28 | 29 | 30 | 31 | 32 |
|---|---|---|---|---|---|---|---|---|---|---|---|---|---|
| 20 | 60 | 55 | 50 | 45 | 40 | 35 | 30 | 25 | 20 | 15 | 10 | 5 | 0 |
| 21 | 56 | 51 | 46 | 41 | 36 | 31 | 26 | 21 | 16 | 11 | 6 | 0 | 0 |
| 22 | 52 | 47 | 42 | 37 | 32 | 27 | 22 | 17 | 12 | 7 | 0 | 0 | 0 |
| 23 | 48 | 43 | 38 | 33 | 28 | 23 | 18 | 13 | 8 | 0 | 0 | 0 | 0 |
| 24 | 42 | 37 | 32 | 27 | 22 | 17 | 12 | 7 | 0 | 0 | 0 | 0 | 0 |
| 25 | 36 | 31 | 26 | 21 | 16 | 11 | 6 | 0 | 0 | 0 | 0 | 0 | 0 |
| 26 | 32 | 27 | 22 | 17 | 12 | 7 | 0 | 0 | 0 | 0 | 0 | 0 | 0 |
| 27 | 28 | 23 | 18 | 13 | 8 | 0 | 0 | 0 | 0 | 0 | 0 | 0 | 0 |
| 28 | 24 | 19 | 14 | 9 | 0 | 0 | 0 | 0 | 0 | 0 | 0 | 0 | 0 |
| 29 | 20 | 15 | 10 | 5 | 0 | 0 | 0 | 0 | 0 | 0 | 0 | 0 | 0 |
| 30 | 16 | 11 | 6 | 0 | 0 | 0 | 0 | 0 | 0 | 0 | 0 | 0 | 0 |
| 31 | 12 | 7 | 0 | 0 | 0 | 0 | 0 | 0 | 0 | 0 | 0 | 0 | 0 |
| 32 | 8 | 0 | 0 | 0 | 0 | 0 | 0 | 0 | 0 | 0 | 0 | 0 | 0 |
| 33 | 4 | 0 | 0 | 0 | 0 | 0 | 0 | 0 | 0 | 0 | 0 | 0 | 0 |
| 34 | 0 | 0 | 0 | 0 | 0 | 0 | 0 | 0 | 0 | 0 | 0 | 0 | 0 |

Referring to Table 1, the detected values D ($t_{ave}$) are digital values obtained by A/D-converting an analog signal output from the temperature detector 29. The digital values do not directly correspond to the temperature. Similarly, the detected values D ($t_{out}$) are digital values obtained by A/D-converting analog signals output from the temperature detectors 25, 26 and 27. The digital values do not directly correspond to the temperature. In Table 1, a detected value corresponding to the lowermost temperature in the environment in which the apparatus is used is made to be 20. The contents of the table indicate the heating time [seconds] for raising the heat generating performance of each of the heater elements 18, 19 and 20 when the projection-type liquid crystal apparatus is turned on.

In an example case where the detected value D ($t_{ave}$) is 25 and the detected value D ($t_{out}$) is 21, the heat generating performance of each of the heater elements 18, 19 and 20 is raised only in 31 seconds when the projection-type liquid crystal apparatus is turned on. If the values exceed the range shown in the foregoing table, for example, if the detected value D ($t_{ave}$) is 33 or more or if the detected value D ($t_{out}$) is 35 or more, the outside temperature of the projection-type liquid crystal apparatus is sufficiently high and the image forming surfaces of the liquid crystal panels 12, 13 and 14 can quickly be heated. Therefore, the heat generating performance of each of the heater elements 18, 19 and 20 is not required to be raised. If both of the detected values D ($t_{ave}$) and D ($t_{out}$) are smaller than 19, the temperature is not higher than the lowermost temperature for the environment in which the projection-type liquid crystal apparatus is operated. Moreover, the image forming surfaces of the liquid crystal panels 12, 13 and 14 are low, the heat generating performance of each of the heater elements 18, 19 and 20 is raised for 60 seconds or longer. However, there is a possibility that the temperature is lower than the lowermost level for the environment in which the apparatus is operated and the image forming surfaces of the liquid crystal panels 12, 13 and 14 cannot be heated to the optimum operation temperatures. In this case, a satisfactorily excellent quality of the image cannot sometimes be obtained.

In a case where the detected value D ($t_{out}$) is larger than 20 and the detected value D ($t_{ave}$) is 19 or smaller, a value in a case where the detected value is D ($t_{ave}$) is 20 is read from the memory 36. If the detected value D ($t_{ave}$) is 20 or larger and the detected value D ($t_{out}$) is 19 or smaller, a value in a case where the detected value D ($t_{out}$) is made to be 20 is read from the memory 36.

The input values (detected temperatures) on the two-dimensional table shown in Table 1 are examples. The input values vary depending upon the temperature characteristic of the resistor 43, the resistance level of the resistor 44, the voltage applied by the DC power source 45 and the number of output bits from the A/D converter shown in FIG. 3. Also the output values (the optimum heat generating periods of time) vary depending upon the heat generating performance of each of the heater elements 18, 19 and 20, the temperature distribution in the projection-type liquid crystal apparatus and the optimum operation temperatures for the liquid crystal panels 12, 13 and 14.

The other structures of the eighth embodiment are the same as those according to the first embodiment. The control according to the eighth embodiment may be applied to the apparatus according to any one of the second to sixth embodiments.

Ninth Embodiment

A projection-type liquid crystal apparatus according to a ninth embodiment of the present invention is the same as that shown in FIG. 10 except for the contents of control which is performed by the control section 35. Therefore, the ninth embodiment will be described with also reference to FIG. 10.

The projection-type liquid crystal apparatus according to the ninth embodiment has a structure such that when temperatures (for example, the temperature corresponding to an average value of values detected by the temperature detectors 25, 26 and 27) detected by the temperature detectors 25, 26 and 27 for detecting the temperatures of the positions adjacent to the liquid crystal panels 12, 13 and 14 are higher than specific temperature $T_1$ and the temperature detected by the temperature detector 29 for detecting the temperature of the outside portion of the apparatus is lower than specific temperature $T_2$, the heat generating performance of each of the heater elements 18, 19 and 20 is intermittently switched between high and low levels. Thus, the image forming surfaces of the liquid crystal panels 12, 13 and 14 are maintained at the optimum operation temperatures.

Specifically, if a determination has been made in accordance with the values (for example, an average value of values detected by the temperature detectors 25, 26 and 27) detected by the temperature detectors 25, 26 and 27 that the image forming surfaces of the liquid crystal panels 12, 13 and 14 have reached the optimum operation temperatures, time in which the heat generating performance of each of the heater elements 18, 19 and 20 is raised and time in which the same is lowered are determined in accordance with a value detected by the temperature detector 29 so that control is performed such that the heat generating performance is intermittently switched between a high level and a low level. The reason for this is that the image forming surfaces of the liquid crystal panels 12, 13 and 14 are maintained at the optimum operation temperatures by elongating the time in which the heat generating performance is raised as the ambient temperature is low.

The projection-type liquid crystal apparatus according to the ninth embodiment is able-to prevent excessively lowering of the temperatures of the image forming surfaces of the liquid crystal panels 12, 13 and 14 than the optimum operation temperatures without considerably lowering of the heat generating performance of each of the heater elements 18, 19 and 20 in a case where the ambient temperature of the apparatus is very low.

The other structures of the ninth embodiment are the same as those according to the seventh embodiment. The control according to the ninth embodiment may be applied to the apparatus according to any one of the foregoing embodiments.

Tenth Embodiment

Figure 13:
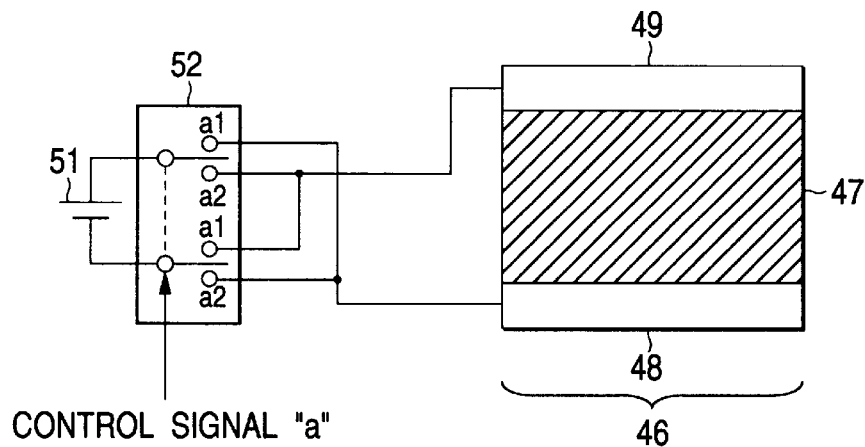
FIG. 13 is a circuit diagram showing a switching circuit for a heater element of a projection-type liquid crystal apparatus according to a tenth embodiment of the present invention.

FIG. 13 is a block diagram showing a switching circuit 52 for the heater element of a projection-type liquid crystal apparatus according to a tenth embodiment of the present invention. Referring to FIG. 13, reference numeral 46 represents any one of heater elements 18, 19 and 20. Reference numeral 47 represents a transparent conductive film, 48 and 49 represent connecting electrodes, 51 represents a power source and 52 represents a switching circuit. The projection-type liquid crystal apparatus according to the tenth embodiment is the same as that shown in FIG. 2 except for the contents of control which is performed by the control section 35. Therefore, the tenth embodiment will be discussed as well as with reference to FIG. 2.

The projection-type liquid crystal display apparatus according to the tenth embodiment has a structure such that a control signal "a" is supplied from the control section 35 (omitted in FIG. 13) to the switching circuit 52 so that voltage of the power source 51 is applied to a contact a1. Thus, an electric current is allowed to flow from the connecting electrode 48 to the connecting electrode 49 through the transparent conductive film 47. After predetermined time has elapsed, the control a for supplying the voltage of the power source 51 to the contact a2 is supplied to the switching circuit 52 so that the switching circuit 52 is switched. Thus, the direction of the electric current is inverted from the connecting electrode 49 to the connecting electrode 48 through the transparent conductive film 47. In order to prevent discomfort for a user from switching of the quality of the image, appropriate switching time is set.

Since the projection-type liquid crystal apparatus according to the tenth embodiment is arranged such that the direction of the electric field which is applied to the transparent conductive film 47 is periodically inverted, also the direction of the electric field which is applied to liquid crystal disposed adjacent to the transparent conductive film 47 is periodically inverted. Thus, deterioration in the liquid crystal attributable to continuous application of the electric field in a predetermined direction can be prevented.

The other structures of the tenth embodiment are the same as those according to the first embodiment. The structure and control according to the tenth embodiment may be applied to the apparatus according to any one of the second to ninth embodiments.

Eleventh Embodiment

Figure 14:
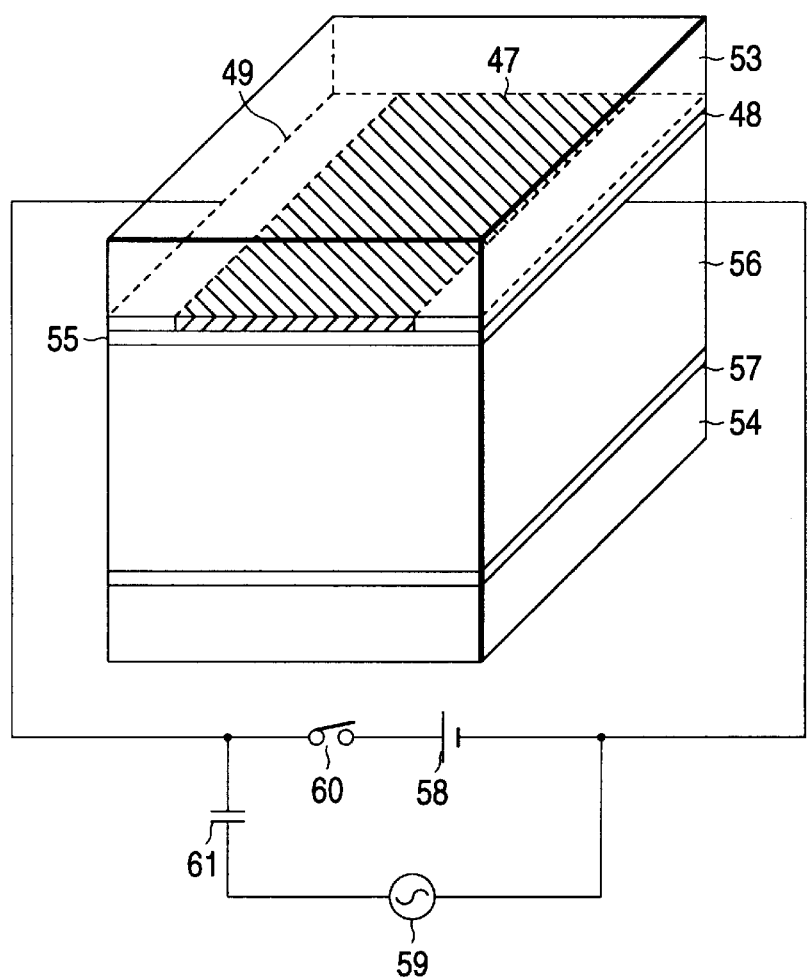
FIG. 14 is a perspective view showing the structure of a projection-type liquid crystal apparatus according to an eleventh embodiment of the present invention.

FIG. 14 is a perspective view showing the structure of a projection-type liquid crystal apparatus according to an eleventh embodiment of the present invention in which liquid crystal panels and heater elements are combined with one another. Referring to FIG. 14, reference numeral 47 represents a transparent conductive film, 48 and 49 represent connecting electrodes, 53 and 54 represent transparent substrates, 55 represents a DC current interruption film, 56 represents a liquid crystal layer, 57 represents a matrix electrode, 58 represents a DC power source, 59 represents an AC power source for operating the liquid crystal panels, 60 represents a switching circuit and 61 represents a capacitor.

As shown in FIG. 14, the projection-type liquid crystal apparatus according to the eleventh embodiment has a structure such that when the temperature detected by the temperature detector for detecting the temperature of a portion adjacent to the liquid crystal panel is lower than a specific level, the switching circuit 60 is switched on so that voltages are applied to the transparent conductive film 47 from both of the DC power source 58 and the AC power source 59. The DC component causes the transparent conductive film 47 to generate heat so that the image forming surface of the liquid crystal panel is heated. The DC current barrier film 55 interrupts the DC component and allows only the AC component to pass through. The AC component is used to drive the liquid crystal panel. As described above, the eleventh embodiment uses the transparent conductive film 47 to serve as the common electrode.

If the temperature detected by the temperature detector for detecting the temperature of a portion adjacent to the liquid crystal panel is higher than the specific level, the switching circuit 60 is switched off so that voltage is applied from the AC power source 59 to the transparent conductive film 47. Since no DC component exists in this case, the transparent conductive film 47 does not generate heat. However, the AC component applied to the transparent conductive film 47 drives the liquid crystal panel similarly to the above-mentioned case.

The other structures of the eleventh embodiment are the same as those according to the first embodiment. The structure according to the eleventh embodiment may be applied to the apparatus according to any one of the second to tenth embodiments.

Twelfth Embodiment

Figure 15:
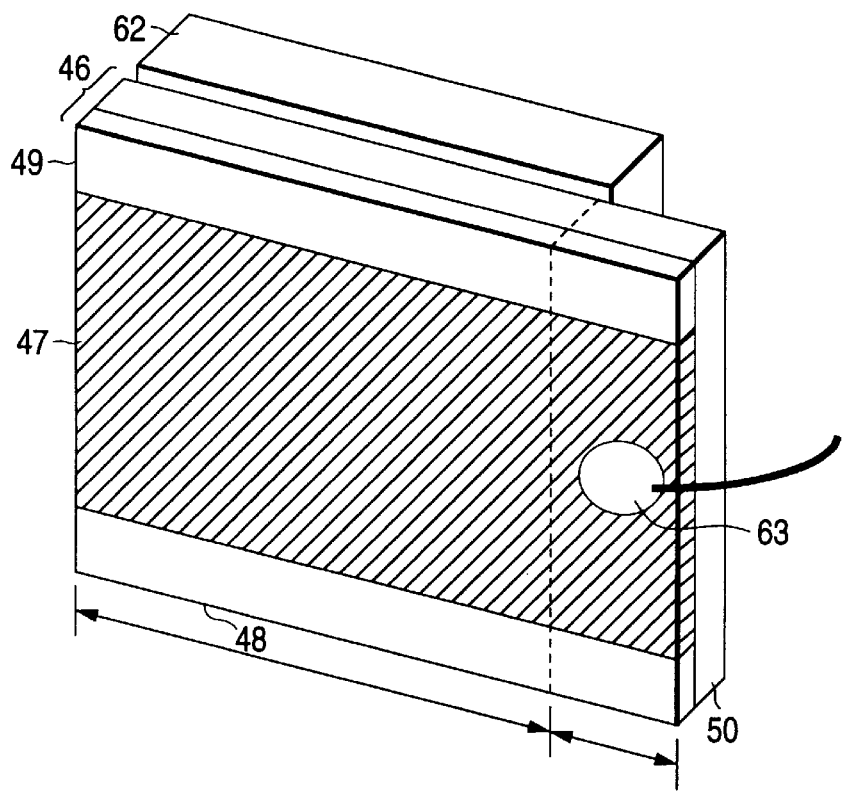
FIG. 15 is a perspective view showing the structure of a projection-type liquid crystal apparatus according to a twelfth embodiment of the present invention.

FIG. 15 is a perspective view schematically showing the structures of heater elements and temperature detectors of a projection-type liquid crystal display apparatus according to a twelfth embodiment of the present invention. Referring to FIG. 15, the same or corresponding structures to those shown in FIG. 6 are given the same reference numerals. Referring to FIG. 15, reference numeral 62 represents a liquid crystal panel and 63 represents a temperature detector (corresponding to temperature detectors 25, 26 and 27 shown in FIG. 2). The projection-type liquid crystal display apparatus according to the twelfth embodiment is the same as that shown in FIG. 2 except for the position at which the temperature detector 63 is attached. Therefore, this embodiment will be described with also reference to FIG. 2.

The projection-type liquid crystal display apparatus according to the twelfth embodiment has the structure such that when the heater elements 18, 19 and 20 are operated, the temperatures of the image forming surfaces of the liquid crystal panels are rapidly raised. Therefore, the correlation between the temperature of the image forming surface of the liquid crystal panel and the temperature of the portion adjacent to the liquid crystal panel is considerably changed before and after the heater elements 18, 19 and 20 have been operated. Therefore, even if the temperature detector 63 is attached adjacent to the liquid crystal panel, the temperature of the image forming surface cannot easily relatively be detected. If the heater element 46 comprising the transparent conductive film 47 is extended to a portion corresponding to the peripheral portion of the image forming surface of the liquid crystal panel and the temperature detector 63 is attached to the foregoing portion as shown in FIG. 15, the temperature of the image forming surface of the liquid crystal panel can accurately be detected even during the operation of the heater element 46.

The other structures according to the twelfth embodiment are the same as those according to the first embodiment. The structure according to the twelfth embodiment may be applied to the apparatus according to any one of the second to eleventh embodiments.

Thirteenth Embodiment

Figure 16:
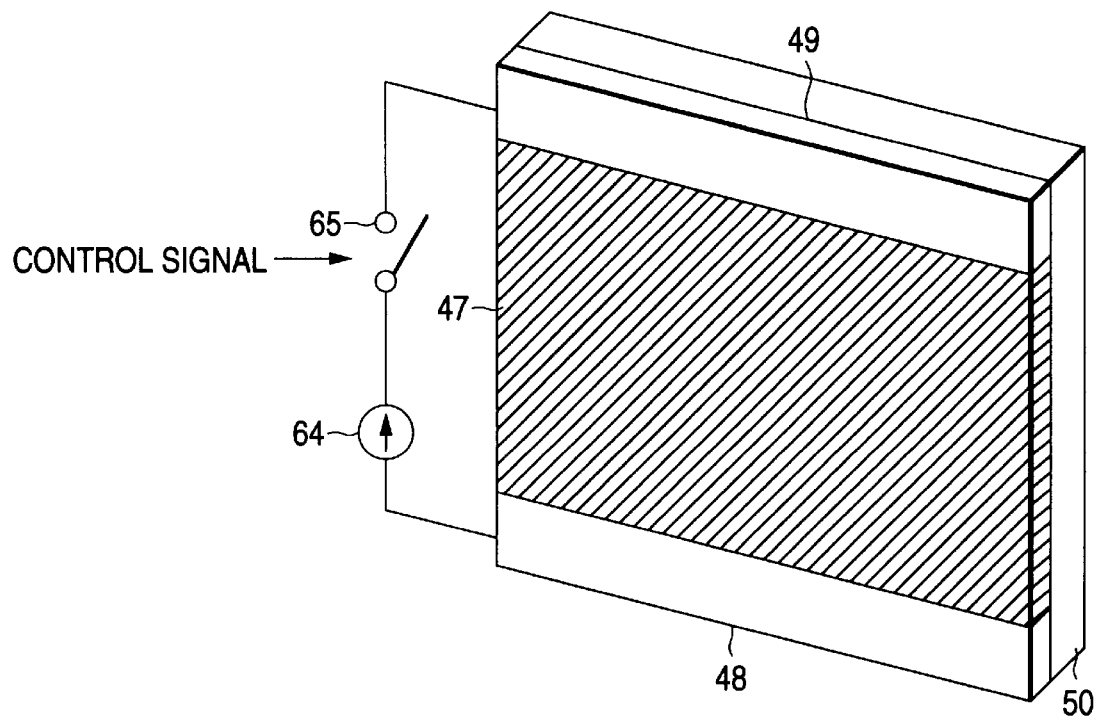
FIG. 16 is a perspective view showing the structure of a projection-type liquid crystal apparatus according to a thirteenth embodiment of the present invention.

FIG. 16 is a diagram showing a drive circuit for heater elements of a projection-type liquid crystal display apparatus according to a thirteenth embodiment of the present invention. Referring to FIG. 16, the same or corresponding structures to those shown in FIG. 6 are given the same reference numerals. Referring to FIG. 16, reference numeral 64 represents a constant-current power source and 65 represents a switching circuit. The projection-type liquid crystal display apparatus according to the thirteenth embodiment is the same as that shown in FIG. 2 except for the drive circuit for the heater elements. Therefore, the thirteenth embodiment will be described also with reference to FIG. 2.

As shown in FIG. 16, the projection-type liquid crystal display apparatus according to the thirteenth embodiment has a structure such that the transparent conductive film 47 is not formed on the surface of the transparent substrate. In a case where a sheet-shape transparent conductive film 47 is directly bonded to the image forming surface of the liquid crystal panel, a constant-current power source is employed as the power source for supplying liquid crystal panel to the transparent conductive film 47. Since the sheet-shape transparent conductive film 47 has higher resistance value as compared with that formed on the transparent substrate by an evaporation method, a sputtering method or a spraying method, the operation with the constant-current power source is able to efficiently heat the image forming surface of the liquid crystal panel as compared with the constant-voltage power source.

The other structures according to the twelfth embodiment are the same as those according to the first embodiment. The drive circuit according to the twelfth embodiment may be applied to the apparatus according to any one of the second to eleventh embodiments.

Fourteenth Embodiment

Figure 17:
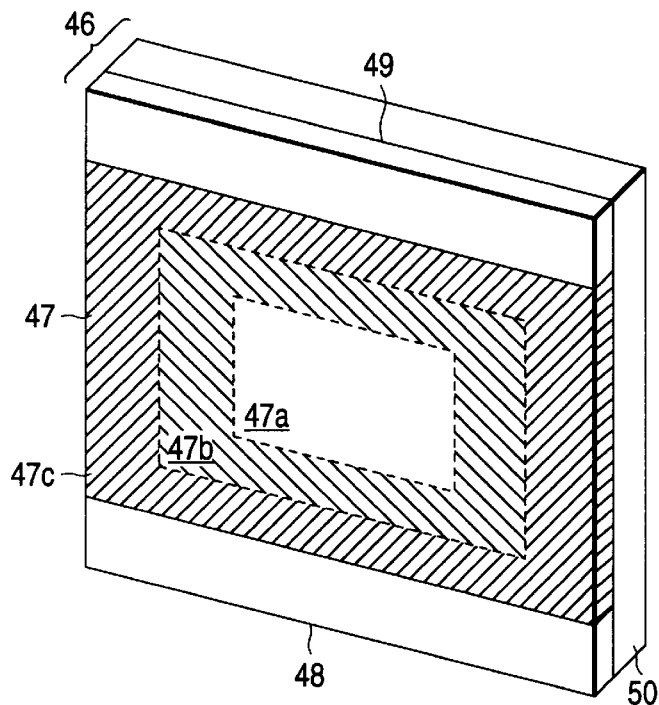
FIG. 17 is a perspective view showing the structure of a projection-type liquid crystal apparatus according to a fourteenth embodiment of the present invention.

FIG. 17 is a perspective view schematically showing the structures of the heater elements 18, 19 and 20 of a projection-type liquid crystal apparatus according to a fourteenth embodiment of the present invention. Referring to FIG. 17, the same or corresponding structures to those shown in FIG. 6 are given the same reference numerals. As shown in FIG. 17, the projection-type liquid crystal apparatus according to the fourteenth embodiment is the same as that shown in FIG. 2 except for the projecting means of the transparent conductive film being different between the central portion and the peripheral portion thereof. Therefore, the fourteenth embodiment will be described also with reference to FIG. 2.

If the ambient temperature is very low, the temperature of the image forming surface of the liquid crystal panel does not reach the optimum operation temperature or only the central portion of the image forming surface is heated and the peripheral portion is remained to be low temperature. The reason for this is that the liquid-crystal-panel cooling fan 23 is not operated and only the central portion is heated with intense incidental light. As a result, shift of characteristic between the applied voltage and the light transmissivity takes place in the image forming surface, causing the ratio of the illuminance at the central portion of the projected image and that in the peripheral portion to considerably deviated from a designed value. As a result, the quality of the image is adversely affected.

The fourteenth embodiment is arranged such that the heat generating performance of the heater element is weakened in the central portion 47a of the image forming surface of the liquid crystal panel, the heat generating performance is somewhat strengthened in an outer portion 47b of the central portion 47a and the heat generating performance of the heater element is strengthened in a peripheral portion 47c of the image forming surface of the liquid crystal panel so that the shift of the characteristic between the applied voltage and the light transmissivity between the central portion and the peripheral portion is prevented. Specifically, the transparent conductive film 47 is formed by a mesh-type conductive film such that the mesh density is made to be rough in a portion corresponding to the central portion 47a of the image forming surface of the liquid crystal panel to raise the resistance value of the transparent conductive film 47. The mesh density is made to be somewhat raised in the outer portion 47b of the central portion 47a, and the same is made to be further raised in a portion corresponding to the peripheral portion 47c of the image forming surface of the liquid crystal panel to raise the resistance value of the transparent conductive film 47. As a result, the heat generating performance of the peripheral portion 47c of the image forming surface of the liquid crystal panel is made to be greater than that of the central portion 46a of the image forming surface of the liquid crystal panel.

The other structures of the fourteenth embodiment are the same as those according to the first embodiment. The structure according to the fourteenth embodiment may be applied to the apparatus according to any one of the second to thirteenth embodiments.

Fifteenth Embodiment

The structure of a projection-type liquid crystal display apparatus according to a fifteenth embodiment will be described with reference to FIG. 17. The fourteenth embodiment has the structure such that the mesh density of the transparent conductive film is made to be different between the central portion and the peripheral portion so that the heat generating performance of the central portion is reduced and the heat generating performance of the peripheral portion is enlarged. However, the fifteenth embodiment is arranged such that the thickness of the transparent conductive film is made to be different from the central portion and the peripheral portion so that the heat generating performance of the central portion of the liquid crystal panel is reduced and the heat generating performance of the peripheral portion is enlarged.

Specifically, as shown in FIG. 17, the thickness of the transparent conductive film 47 is reduced in a portion corresponding to the central portion 47a of the image forming surface of the liquid crystal panel to raise the resistance value of the transparent conductive film. The thickness is somewhat enlarged in the outer portion 47b of the central portion 47a, and that is enlarged in a portion corresponding to the peripheral portion 47c of the image forming surface of the liquid crystal panel so as to lower the resistance value of the transparent conductive film. As a result, the heat generating performance of the peripheral portion 47c of the image forming surface of the liquid crystal panel is made to be larger than that of the central portion 47a of the image forming surface of the liquid crystal panel.

As described above, the heat generating performance of the heater element 46 is weakened in the central portion of the image forming surface of the liquid crystal panel and the heat generating performance of the heater element 46 is enlarged in the peripheral portion of the image forming surface of the liquid crystal panel so that deterioration in the quality of the image occurring due to the difference in the characteristic between the applied voltage and the light transmissivity between the central portion and the peripheral portion is prevented.

The other structures of the fifteenth embodiment are thickness same as those according to the fourteenth embodiment except for the above-mentioned structures. The structure according to the fifteenth embodiment may be applied to the apparatus according to any one of the second to thirteenth. embodiments.

Sixteenth Embodiment

Figure 18:
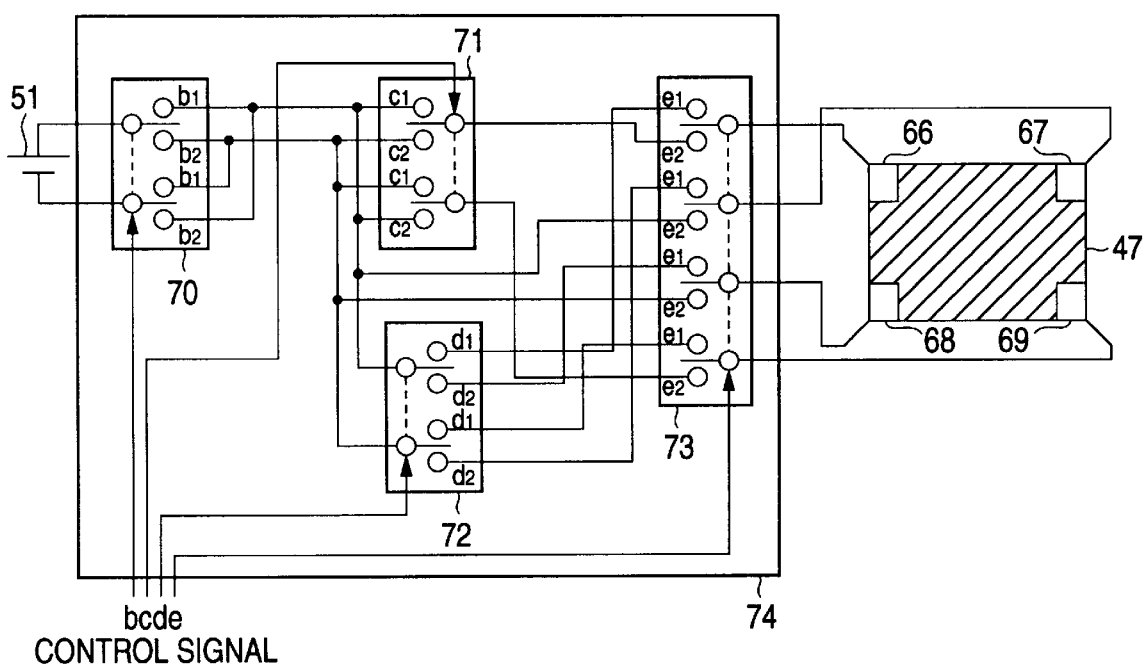
FIG. 18 is a view of explanatory showing the shape of a connecting electrode of the heater element and a switching circuit of the projection-type liquid crystal apparatus according to a sixteenth embodiment of the present invention.

FIG. 18 is a block diagram showing the structures of the heater elements 18, 19 and 20 and a control circuit of a projection-type liquid crystal display apparatus according to a sixteenth embodiment of the present invention. Referring to FIG. 18, reference numeral 47 represents a transparent conductive film, 51 represents a power source and 66 to 69 represent connecting electrodes connected to the four corners of the transparent conductive film 47. Reference numeral 70 to 73 represents switching circuits, 74 represents a heater control circuit for controlling the voltage which is applied to each of the connecting electrodes 66 to 69. The projection-type liquid crystal display apparatus according to the sixteenth embodiment is the same as that shown in FIG. 2 except for the connecting electrodes being provided for the four corners and the direction in which an electric current is allowed to flow in the transparent conductive film 47 by the heater control circuit. Therefore, the sixteenth embodiment will be described also with reference to FIG. 2.

Figure 19:
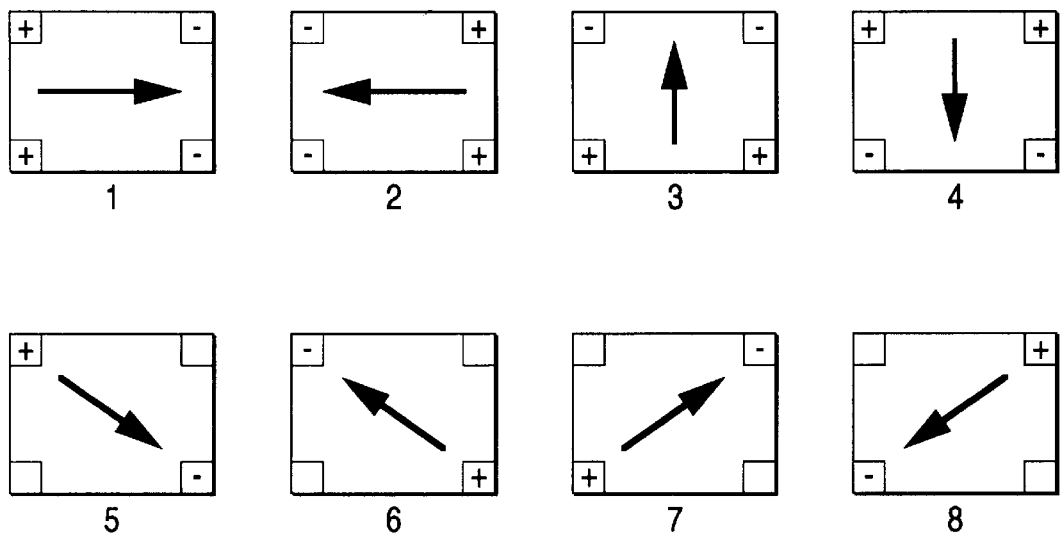
FIG. 19 is a view of explanatory showing combinations of electric current patterns which are allowed to flow to the heater element shown in FIG. 18 and control signals for the switch circuit.

The projection-type liquid crystal display apparatus according to the sixteenth embodiment uses a fact that the potential is lowered from the beginning point toward the end point and the beginning point generates heat somewhat higher than that generated at the end point so as to correct the temperature inclination. The independent connecting electrodes 66, 67, 68 and 69 resistance are disposed at the four corners of the transparent conductive film 47 and lead lines attached to the connecting electrodes 66, 67, 68 and 69 are connected to the control circuit 74 comprising a plurality of switching circuits 70, 71, 72 and 73. A control section 35 (not shown in FIG. 18) supplies control signals b, c, d and e to the control circuit 74 so that the switching circuits 70, 71, 72 and 73 select corresponding contacts $b_1$, $c_1$, $d_1$, $e_1$, $b_2$, $c_2$, $d_2$ and $e_2$ to select a control pattern from eight types of control patterns as shown in FIG. 19. Thus, the temperature inclination is corrected by using voltage drop.

In the case of the control circuit 74 as shown in FIG. 18, either of two combinations of the control signals b, c, d and e shown in FIG. 19 is selected to select an arbitrary control pattern. In an example case where the temperature inclination in which the temperature is raised from the left-hand side of the liquid crystal panel toward the right-hand side, control pattern 1 in which control signals b, c, d and e, which are supplied to the switching circuits 70, 71, 72 and 73 are 0, 0, 0 and 0 or 0, 0, 1 and 0 so that correction is performed. In the case where the control signals b, c, d and e respectively are 0, 0, 0 and 0, the switching circuits 70, 71, 72 and 73 respectively select the contacts $b_2$, $c_2$, $d_2$ and $e_2$. In the case where the controls b, c, d and e respectively are 1, 1, 1 and 1, the switching circuits 70, 71, 72 and 73 respectively select the contacts $b_1$, $c_1$, $d_1$ and $e_1$.

As described above, the apparatus according to the sixteenth embodiment is able to prevent irregular temperature distribution in the liquid crystal panel occurring due to air flow generated by the liquid-crystal-panel cooling fan 23 or the like. That is, the cooling performance of the portion downwind of the image forming surface is weak and the temperature of the portion is raised as compared with that of an upwind portion so that temperature inclination takes place even in one liquid crystal panel. Thus, irregular illumination of the projected image occurs. However, the apparatus according to the sixteenth embodiment is able to prevent irregular illuminance of the quality of the image.

The other structures of the sixteenth embodiment are the same as those according to the first embodiment. The structure according to the sixteen embodiment may be applied to the apparatus according to any one of the second to sixteenth embodiments.

Seventeenth Embodiment

Figure 20:
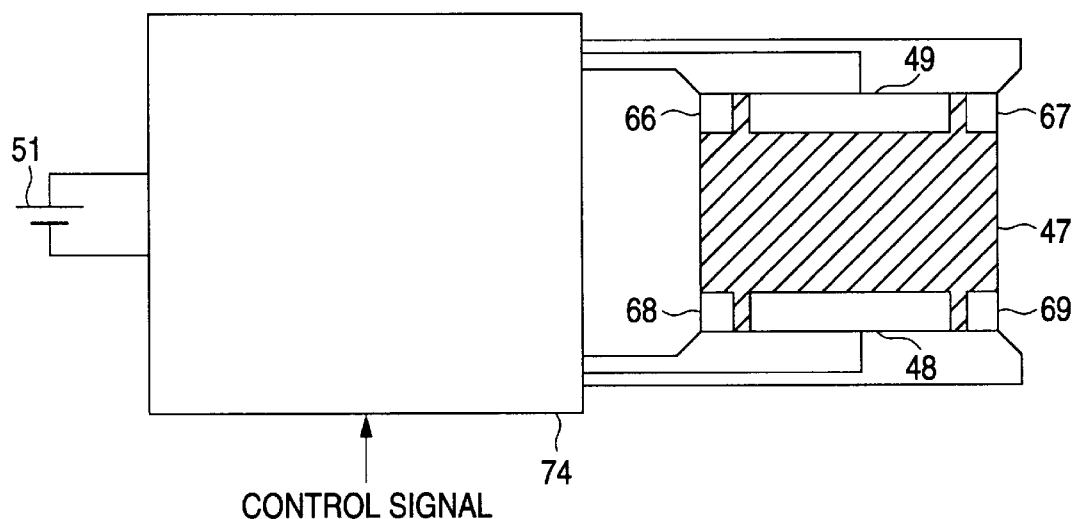
FIG. 20 is a view of explanatory showing the shape of a heater element and a switching circuit of a projection-type liquid crystal apparatus according to a seventeenth embodiment of the present invention.

FIG. 20 is a block diagram showing connecting electrodes for the light source heater elements 18, 19 and 20 and a control circuit of a projection-type liquid crystal apparatus according to a seventeenth embodiment. Referring to FIG. 20, the same or corresponding structures to those shown in FIG. 18 are given the same reference numerals. Referring to FIG. 20, reference numerals 48 and 49 represent connecting electrodes. The projection-type liquid crystal apparatus according to the seventeenth embodiment is the same as that shown in FIG. 18 except for the connecting electrodes 48 and 49 being added. The seventeenth embodiment will be described also with reference to FIG. 2.

In addition to the structure according to the sixteenth embodiment in which the connecting electrodes are provided for the four corners of the heater element, the electrodes are provided at positions 48 and 49 shown in FIG. 20. Thus, the connecting electrodes 48 and 49 are operated when the control pattern 3 or 4 according to the sixteenth embodiment is selected. Thus, an effect similar to that obtainable from the heater element shown in FIG. 13 can be obtained.

The other structures of the seventeenth embodiment are the same as those according to the sixteenth embodiment. The structure of the seventeenth embodiment may be applied to the apparatus according to any one of the above-mentioned embodiments.

Eighteenth Embodiment

Figure 21:
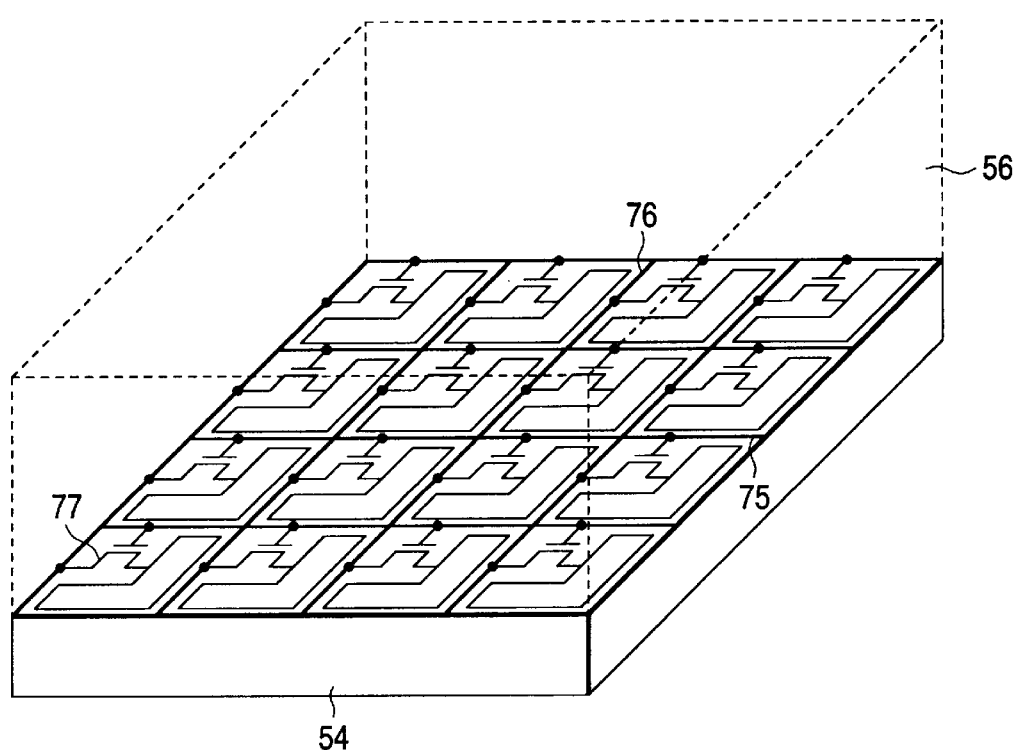
FIG. 21 is a perspective view schematically showing a source electrode and a matrix wiring pattern of a liquid crystal panel of a projection-type liquid crystal apparatus according to an eighteenth embodiment of the present invention.

FIG. 21 is a perspective view schematically showing a source electrode of the liquid crystal panel 12 and matrix wiring pattern of a projection-type liquid crystal apparatus according to an eighteenth embodiment of the present invention. Referring to FIG. 21, reference numeral 54 represents a transparent substrate, 56 represents a liquid crystal layer, 75 represents a scanning electrode, 76 represents a signal electrode and 77 represents a thin-film transistor. The projection-type liquid crystal apparatus according to the eighteenth embodiment is the same as that shown in FIG. 2 except for the shape of the transparent conductive film. Therefore, the eighteenth embodiment will be described also with reference to FIG. 2.

A method has been described in the first embodiment in which the hysteresis phenomenon occurring when the apparatus is operated at low temperatures is prevented by attaching the heater elements 18, 19 and 20 comprising the transparent conductive films to the image forming surfaces of the liquid crystal panels to heat the image forming surfaces of the liquid crystal panels. If the patterns of the transparent conductive films are disposed regardless of the positions of the matrix electrodes (the scanning electrode 75 and the signal electrode 76), there arise problems in that the pattern of the transparent conductive film is reflected on the projected image, an adverse influence arises because of wavelength dependency and the transmissivity is lowered. The apparatus according to the eighteenth embodiment has the structure such that the pattern of the transparent conductive film is disposed to optically coincide with the matrix electrode so that deterioration in the quality of the image occurring due to attachment of the transparent conductive film is prevented. The "optically coincident position" is a position at which the shadow of the pattern of the transparent conductive film is projected onto the matrix electrode when the heater element is attached to the incidental side of the liquid crystal panel.

The other structures of the eighteenth embodiment are the same as those according to the second embodiment. The structure of the eighteenth embodiment may be applied to the apparatus according to any one of the above-mentioned embodiments.

Although the above-mentioned embodiment has been described about the triple-plate typed apparatus using three liquid crystal panels 12, 13 and 14, a single-plate typed apparatus using one liquid crystal panel may be employed.

Although an example has been described in the foregoing embodiments in which the temperature detectors respectively are provided for the positions adjacent to the red, green and blue liquid crystal panels. The temperature detector may be provided for the position adjacent to only one representative liquid crystal panel (for example, the green liquid crystal panel) to correlatively calculate the temperatures of the image forming surfaces of the two other liquid crystal panels in accordance with the temperature detected by the temperature detector.

According to the first aspect of the present invention, the heat generating performance of the transparent conductive film is controlled in accordance with a value detected by the temperature detection performed adjacent to the liquid crystal light valve. Therefore, the image forming surface of the liquid crystal light valve can quickly be raised to the optimum operation temperature. Thus, an effect can be obtained in that an excellent image can be displayed in a short time even if the environment temperature is low.

Since the second aspect has the structure in which the heat generating performance of each of the first to third conductive films is individually set in accordance with values respectively detected by the first to third temperature detectors, an effect can be obtained in that deterioration in the quality of the image occurring because of the difference in the temperature between the liquid crystal panels can be prevented.

The third aspect of the present invention is arranged such that if the temperature detected-by the liquid crystal temperature detection means is lower than a first predetermined reference temperature, the transparent conductive film is caused to generate heat with the air fan being interrupted. If the temperature detected by the liquid crystal temperature detection means is not lower than the first reference temperature and lower than the second predetermined reference temperature, the transparent conductive film is caused to generate heat with the air fan being operated. Therefore, an effect can be obtained in that the image forming surface of the liquid crystal light valve means can quickly be raised to the optimum operation temperature. Another effect can be obtained in that if the liquid crystal light valve means has been heated to a level higher than the first reference temperature, the temperature inclination of the image forming surface of the liquid crystal light valve means can be reduced.

Since the fourth aspect is structured such that the heat generating performance of the transparent conductive film is controlled in accordance with the total sum of a value obtained by multiplying each of values detected by the plural temperature detectors with the weighting coefficients, the temperature of the image forming surface of the liquid crystal light valve can be controlled in consideration of the color balance in a case of, for example, a three-plate type structure. Thus, an effect can be obtained in that the white balance of the image can be improved.

Since the fifth aspect is structured such that the heat generating performance of the liquid crystal temperature detection is maintained at a constant level if the temperature detected by the liquid crystal temperature detection means is not lowered by a predetermined temperature in a predetermined period of time after the heat generating performance of the transparent conductive film has been lowered by the control section, small change of the temperature of the liquid crystal light valve means in short periods can be prevented. Thus, an effect can be obtained in that excessively frequent change in the illuminance of the projected image can be prevented.

Since the sixth aspect is arranged such that the heat generating performance of the transparent conductive film is set to a high level in accordance with a value detected by the liquid crystal temperature detection when the apparatus has been turned on, the image forming surface of the liquid crystal light valve can quickly be raised to the optimum operation temperature. Since the time in which the heat generating performance of the transparent conductive film is switched to a low level is controlled in accordance with a temperature detected by the liquid crystal temperature detection, an effect can be obtained in that the temperature of the image forming surface of the liquid crystal light valve can be maintained to a level near the optimum operation temperature.

The seventh aspect is structured such that the heat generating performance of the transparent conductive film is lowered in accordance with a value detected by an external temperature detection if a determination has been made that the value detected by the liquid crystal temperature detection has reached the optimum operation temperature in accordance with the value detected by the external temperature detection. Therefore, an effect can be obtained in that the image forming surface of the liquid crystal light valve can quickly be brought to a constant state (the optimum operation temperature).

The eighth aspect has the structure such that storage is provided which previously stores a controlled value of optimum time in which the heat generating performance of the transparent conductive film with respect to a value detected by the external temperature detection and a value detected by the liquid crystal temperature detection is made to be second heat generating performance to perform switching of the heat generating performance of the transparent conductive film in accordance with the controlled value. Therefore, an effect can be obtained in that the image forming surface of the liquid crystal light valve can quickly be brought to a constant state.

The ninth aspect further comprises external temperature detection for detecting the temperature of the outside of the apparatus, wherein the heat generating performance of the transparent conductive film can be switched at least between first heat generating performance and second heat generating performance higher than the first heat generating performance, and when a determination has been made that the value detected by the liquid-crystal temperature detection has been raised to an optimum operation temperature during control of the heat generating performance of the transparent conductive film in accordance with the value detected by the external temperature detection, the heat generating performance of the transparent conductive film is switched in accordance with the value detected by the external temperature detection. Therefore, an effect can be obtained in that the image forming surface of the liquid crystal light valve means can quickly be brought to a constant state.

Since the tenth aspect further comprises inverting at predetermined periods, a direction of DC voltage which is applied to the transparent conductive film by the driver of the transparent conductive film, an effect can be obtained in that deterioration in the liquid crystal can be prevented.

Since the eleventh aspect has the structure such that the common electrode of the liquid crystal light valve also serves as the heater, the cost can be reduced as compared with a structure in which the liquid crystal light valve and the transparent conductive film are individually provided. Since the optical path can be elongated, an effect can be obtained in that the size of the optical system can be reduced. Since the transparent conductive film and the transparent substrate which must individually be provided in the case where the liquid crystal panel and the heater element are individually provided can be omitted, effects can be obtained in that the transmissivity can be raised and the illuminance of the projected image can be raised.

Since the twelfth aspect has the structure such that the liquid crystal temperature detection is disposed on the outside of the image forming surface of the liquid crystal light valve, effects can be obtained in that the temperature of the image forming surface of the liquid crystal light valve can accurately be detected and thus appropriate temperature control can be performed.

Since the thirteenth aspect has the structure in which the transparent conductive film is formed on the image forming surface of the liquid crystal light valve, an effect can be obtained in that the image forming surface can efficiently be heated.

Since the fourteenth aspect has the structure in which the transparent conductive film is caused to generate heat by the constant-current power source, an effect can be obtained in that the image forming surface of the liquid crystal light valve means can efficiently be heated.

Since the fifteenth aspect of the present invention is structured such that the heat generating performance in the peripheral portion of the transparent conductive film is made to be stronger than that in the central portion, an effect can be obtained in that deterioration in the quality of the image occurring because of irregular temperature distribution in the image forming surface of the liquid crystal light valve can be prevented.

Since the sixteenth aspect of the present invention is structured such that the thickness of the transparent conductive film is made to be large in the central portion and the same is small in the peripheral portion, an effect can be obtained in that deterioration in the quality of the image occurring because of the irregular temperature distribution in the image forming surface of the liquid crystal light valve can be prevented.

Since the seventeenth aspect is structured such that the thickness of the transparent conductive film is large in the central portion and the same is small in the peripheral portion, an effect can be obtained in that deterioration in the quality of the image occurring because of the irregular temperature distribution in the image forming surface of the liquid crystal light valve can be prevented.

Since the eighteenth aspect has the structure in which the electrode portions for applying voltages to the transparent conductive film are connected to the four corners of the transparent conductive film and the drive means switches the voltages respectively applied to the electrode portions, an effect can be obtained in that illuminance inclination of the projected image occurring due to temperature inclination in the image forming surface of the liquid crystal light valve can be prevented.

Since the nineteenth aspect is structured such that the electrode portion for applying voltage to the transparent conductive film is connected to the four corners of the transparent conductive film and the central portions of the opposite sides and the driver drive switches the voltages which are applied to the electrode portions, an effect can be obtained in that illuminance inclination of the projected image occurring due to temperature inclination of the image forming surface of the liquid crystal light valve can be prevented.

Since the twentieth aspect is structured such that the matrix electrode of the liquid crystal light valve and the pattern of the transparent conductive film are disposed at the optically coincident position, an effect can be obtained in that deterioration in the quality of the image occurring due to provision of the transparent conductive film can be minimized.

What is claimed is:

1. A projection-type liquid crystal display apparatus comprising:

light source means;

a liquid crystal light valve means for modulating a light beam emitted by said light source means;

projecting means for projecting a light beam modulated by said liquid crystal light valve means onto a screen;

a liquid-crystal temperature detection means for detecting the temperature of a portion adjacent to said liquid crystal light valve means;

a transparent conductive film formed adjacent to a surface of said liquid crystal valve means on which an image will be formed, said transparent conductive film being formed on a light path for the light beam emitted from said light source means;

drive means for causing said transparent conductive film to generate heat; and control means for controlling heat generating performance of said transparent conductive film in accordance with a value detected by said liquid-crystal temperature detection means, wherein said liquid-crystal temperature detection means includes a plurality of temperature detectors, and said control means controls the heat generating performance of said transparent conductive film in accordance with a total sum of a value obtained by multiplying each of values detected by said plurality of temperature detectors with a weighting coefficient.

2. The projection-type liquid crystal display apparatus according to claim 1, wherein said liquid crystal light valve means includes first to third liquid crystal panels for respectively forming monochrome images for first to third colors, said liquid-crystal temperature detection means includes first to third temperature detectors for respectively detecting the temperature of portions adjacent to said first to third liquid crystal panels, said transparent conductive film includes first to third conductive films respectively formed adjacent to said first to third liquid crystal panels, and said drive means is controlled by said control means such that the heat generating performance of each of said first to third conductive films is controlled respectively in accordance with each of values detected by said first to third temperature detectors.

3. The projection-type liquid crystal display apparatus according to claim 1, further comprising an air fan for allowing air around the liquid crystal light valve means to flow, wherein in the case that the temperature detected by said liquid-crystal temperature detection means is lower than a first predetermined reference temperature, said transparent conductive film is caused to generate heat with the operation of said air fan interrupted, in the case that the temperature detected by said liquid-crystal temperature detection means is not lower than said first reference temperature and lower than a second predetermined reference temperature, said transparent conductive film is caused to generate heat with said air fan being operated, and in the case that the temperature detected by said liquid-crystal temperature detection means is not lower than a second predetermined temperature, the heat generating performance of said transparent conductive film is lowered.

4. The projection-type liquid crystal display apparatus according to claim 1, wherein the heat generating performance of said transparent conductive film can be switched at least between first heat generating performance and second heat generating performance higher than said first heat generating performance, said transparent conductive film is operated with said second heat generating performance when said apparatus is turned on, and time at which the operation of said transparent conductive film with said second heat generating performance is switched to the operation with said first heat generating performance is determined in accordance with a value detected by an external temperature detection means for detecting the temperature of the outside of said apparatus.

5. The projection-type liquid crystal display apparatus according to any one of claims 1, further comprising external temperature detection means for detecting the temperature of the outside of said apparatus, wherein when a determination has been made that the value detected by said liquid-crystal temperature detection means has been raised to an optimum operation temperature during control of the heat generating performance of said transparent conductive film in accordance with the value detected by said external temperature detection means, the heat generating performance of said transparent conductive film is lowered in accordance with the value detected by said external temperature detection means.

6. The projection-type liquid crystal display apparatus according to claim 1, further comprising external temperature detection means for detecting the temperature of the outside of said apparatus, wherein the heat generating performance of said transparent conductive film can be switched at least between first heat generating performance and second heat generating performance higher than said first heat generating performance, storage means is provided which previously stores a control value of optimum time at which the heat generating performance of said transparent conductive film is made to be said second heat generating performance with respect to a value detected by said external temperature detection means and a value detected by said liquid-crystal temperature detection means, and the heat generating performance of said transparent conductive film is switched in accordance with said control value stored in said storage means corresponding to the value detected by said external temperature detection means and the value detected by said liquid-crystal temperature detection means.

7. The projection-type liquid crystal display apparatus according to claim 1, further comprising external temperature detection means for detecting the temperature of the outside of said apparatus, wherein the heat generating performance of said transparent conductive film can be switched at least between first heat generating performance and second heat generating performance higher than said first heat generating performance, and when a determination has been made that the value detected by said liquid-crystal temperature detection means has been raised to an optimum operation temperature during control of the heat generating performance of said transparent conductive film in accordance with the value detected by said external temperature detection means, the heat generating performance of said transparent conductive film is switched in accordance with the value detected by said external temperature detection means.

8. The projection-type liquid crystal display apparatus according to claim 1, further comprising inverting means for, at predetermined periods, inverting a direction of DC voltage which is applied to said transparent conductive film by said drive means of said transparent conductive film.

9. The projection-type liquid crystal display apparatus according to claim 1, wherein said liquid-crystal temperature detection means is disposed on the outside of an image forming surface of said liquid crystal light valve means.

10. The projection-type liquid crystal apparatus according to claim 1, wherein said transparent conductive film is formed on an image forming surface of said liquid crystal light valve means.

11. The projection-type liquid crystal apparatus according to claim 10, further comprising a constant-current power source for supplying electric power to said transparent conductive film.

12. The projection-type liquid crystal display apparatus according to claim 1, wherein the heat generating performance of said transparent conductive film in the peripheral portion thereof is made to be stronger than that in the central portion thereof.

13. The projection-type liquid crystal display apparatus according to claim 12, wherein said transparent conductive film is formed by a mesh-shape conductive film having a mesh density which is low in the central portion thereof and high in the peripheral portion thereof.

14. The projection-type liquid crystal display apparatus according to claim 12, wherein the thickness of said transparent conductive film is small in the central portion of said transparent conductive film and large in the peripheral portion of the same.

15. The projection-type liquid crystal display apparatus according to claim 1, wherein electrode portions for applying voltage to said transparent conductive film are connected to four corners of said transparent conductive film, and said drive means switches voltages which are respectively applied to said electrode portions.

16. The projection-type liquid crystal display apparatus according to claim 1, wherein said electrode portions for applying voltage to said transparent conductive film are connected to four corners of said transparent conductive film and central portions of opposite sides of said transparent conductive film, and said drive means switches voltages which are respectively applied to said electrode portions.

17. The projection-type liquid crystal apparatus according to claim 1, wherein said liquid crystal light valve means has scanning electrodes and signal electrodes disposed in a matrix configuration, and said transparent conductive film is formed on only positions at which said transparent conductive film overlaps said scanning electrodes and signal electrodes disposed in the matrix configuration.

18. A projection-type liquid crystal display apparatus comprising:

light source means;

a liquid crystal light valve means for modulating a light beam emitted by said light source means;

projecting means for projecting a light beam modulated by said liquid crystal light valve means onto a screen;

a liquid-crystal temperature detection means for detecting the temperature of a portion adjacent to said liquid crystal light valve means;

a transparent conductive film formed adjacent to a surface of said liquid crystal valve means on which an image will be formed, said transparent conductive film being formed on a light path for the light beam emitted from said light source means;

drive means for causing said transparent conductive film to generate heat; and control means for controlling heat generating performance of said transparent conductive film in accordance with a value detected by said liquid-crystal temperature detection means, wherein after the temperature detected by said liquid-crystal temperature detection means has been raised to an optimum operation temperature and the heat generating performance of said transparent conductive film has been lowered or turned off, a first process is repeated if $|D(t)-D(t-\Delta t)|>D_{th}$ is satisfied where a value detected by said liquid-crystal temperature detection means at time $t-\Delta t$ (where $\Delta t$ is a predetermined unit period of time) is $D(t-\Delta t)$, a value detected by said liquid-crystal temperature detection means at time t is $D(t)$ and a predetermined reference value is $D_{th}$ such that the heat generating performance of said transparent conductive film is raised, and the heat generating performance of said transparent conductive film is not changed and thus the same is fixed if $|D(t)-D(t-\Delta t)|=D_{th}$, detected value $D(t')$ when the heat generating performance of said transparent conductive film has been changed finally is stored, and a second process is performed where the relationship $|D(t)-D(t-\Delta t)|=D_{th}$ is satisfied after said first process has been repeated and the process for fixing the heat generating performance of said transparent conductive film without changing the same has been repeated by a predetermined number of times such that the heat generating performance of said transparent conductive film is controlled in accordance with the detected value $D(t)$ if the absolute value $|D(t)-D(t')|$ of an amount of change between the detected value $D(t)$ after a predetermined period of time has elapsed and the stored value $D(t')$ is larger than a predetermined reference value $D_{th}$, and the heat generating performance of said transparent conductive film is not changed and the same is fixed if the absolute value is not larger than the reference value $D_{th}'$.

19. A projection-type liquid crystal display apparatus comprising:

light source means;

a liquid crystal light valve means for modulating a light beam emitted by said light source means;

projecting means for projecting a light beam modulated by said liquid crystal light valve means onto a screen;

a liquid-crystal temperature detection means for detecting the temperature of a portion adjacent to said liquid crystal light valve means;

a transparent conductive film formed adjacent to a surface of said liquid crystal valve means on which an image will be formed, said transparent conductive film being formed on a light path for the light beam emitted from said light source means;

drive means for causing said transparent conductive film to generate heat; and control means for controlling heat generating performance of said transparent conductive film in accordance with a value detected by said liquid-crystal temperature detection means, wherein said liquid crystal light valve means includes a source electrode, to which an image signal is supplied, and a liquid crystal layer, said transparent conductive film forms a common electrode of said liquid crystal light valve means, and said apparatus comprises a DC current interrupting film disposed between said liquid crystal layer and said transparent conductive film, and common voltage applying means for applying AC common voltage to said transparent conductive film.

* * * * *